United States Patent
Sheikh Faridul et al.

(10) Patent No.: US 11,308,340 B2
(45) Date of Patent: Apr. 19, 2022

(54) VERIFICATION METHOD AND SYSTEM

(71) Applicant: Onfido Ltd., London (GB)

(72) Inventors: Hasan Sheikh Faridul, London (GB); Mohamed Ben Arbia, London (GB)

(73) Assignee: Onfido Ltd., London (GB)

( * ) Notice: Subject to any disclaimer, the term of this patent is extended or adjusted under 35 U.S.C. 154(b) by 60 days.

(21) Appl. No.: 16/108,183

(22) Filed: Aug. 22, 2018

(65) Prior Publication Data

US 2019/0065875 A1 Feb. 28, 2019

(30) Foreign Application Priority Data

Aug. 22, 2017 (GB) ...................................... 1713469
Aug. 22, 2017 (GB) ...................................... 1713471

(51) Int. Cl.
*G06K 9/62* (2006.01)
*G06K 9/00* (2022.01)
(Continued)

(52) U.S. Cl.
CPC .......... *G06K 9/00906* (2013.01); *G01S 15/04* (2013.01); *G06F 3/04883* (2013.01);
(Continued)

(58) Field of Classification Search
CPC .......... G06K 9/00906; G06K 9/00208; G06K 9/00255; G06K 9/00275; G06K 9/00892;
(Continued)

(56) References Cited

U.S. PATENT DOCUMENTS 8,396,265 B1 * 3/2013 Ross .................. G06K 9/00214
382/118
9,075,975 B2 * 7/2015 Bud ........................ H04L 63/08
(Continued)

FOREIGN PATENT DOCUMENTS

CN 107066983 8/2017
WO WO 2016/076912 5/2016
(Continued)

OTHER PUBLICATIONS

Supplementary European Search Report and the European Search Opinion dated Jan. 23, 2019 From the European Patent Office Re. Application No. 18190068.9. (10 Pages).
(Continued)

*Primary Examiner* — Sean T Motsinger

(57) ABSTRACT

The present invention relates to a method of verifying that (or determining whether) a biometric feature of a live human is present. More particularly, the present invention relates to a method of verifying that (or determining whether) a biometric feature of a live human is present for use as part of a biometric recognition system and/or method. In particular, the invention relates to a method 100 of determining whether a biometric feature of a live human is present, comprising: using a camera 106, capturing 202 visual data of a presented biometric feature; transmitting 204 a signal towards the biometric feature; using a sensor 108, capturing 206 data related to a reflected signal from the presented biometric feature; and determining 208 whether the visual data and the reflected signal data relate to a biometric feature having realistic dimensions thereby to determine 210 that a live biometric feature is present.

24 Claims, 16 Drawing Sheets

(51) Int. Cl.
  *G06K 9/46* (2006.01)
  *G01S 15/04* (2006.01)
  *G06F 3/04883* (2022.01)
  *G06F 21/32* (2013.01)
  *G06N 3/02* (2006.01)
(52) U.S. Cl.
  CPC ......... *G06F 21/32* (2013.01); *G06K 9/00208* (2013.01); *G06K 9/00255* (2013.01); *G06K 9/00275* (2013.01); *G06K 9/00892* (2013.01); *G06K 9/00899* (2013.01); *G06K 9/00926* (2013.01); *G06K 9/4661* (2013.01); *G06N 3/02* (2013.01)
(58) Field of Classification Search
  CPC ........... G06K 9/00899; G06K 9/00926; G06K 9/4661; G01S 15/04; G06F 3/04883; G06F 21/32; G06N 3/02
  See application file for complete search history.

(56) References Cited

U.S. PATENT DOCUMENTS

| | | | | |
|---|---|---|---|---|
| 9,251,427 | B1* | 2/2016 | Chu | G06K 9/00248 |
| 2009/0261979 | A1* | 10/2009 | Breed | G01F 23/0076 |
| | | | | 340/576 |
| 2014/0007224 | A1 | 2/2014 | Lu et al. | |
| 2015/0033305 | A1* | 1/2015 | Shear | G06F 21/53 |
| | | | | 726/6 |
| 2016/0035483 | A1* | 2/2016 | Yamada | H01F 27/29 |
| | | | | 336/192 |
| 2016/0180083 | A1* | 6/2016 | Costigan | G06K 9/6296 |
| | | | | 726/23 |
| 2016/0335483 | A1* | 11/2016 | Pfursich | H04W 12/0605 |
| 2016/0342851 | A1* | 11/2016 | Holz | G06K 9/00288 |
| 2016/0371555 | A1* | 12/2016 | Derakhshani | A61B 5/0077 |
| 2017/0082740 | A1* | 3/2017 | Kitchens, II | G06K 9/0012 |
| 2017/0124394 | A1 | 5/2017 | Thavalengal | |
| 2017/0143241 | A1 | 5/2017 | McBain | |
| 2017/0169304 | A1* | 6/2017 | Jia | H04L 63/0861 |
| 2017/0206413 | A1 | 7/2017 | Hanna et al. | |
| 2018/0156907 | A1* | 6/2018 | Cegla | G01S 13/22 |
| 2018/0173980 | A1* | 6/2018 | Fan | G06K 9/00906 |
| 2018/0239955 | A1* | 8/2018 | Rodriguez | G06F 21/32 |
| 2018/0239977 | A1* | 8/2018 | Matsimanis | G06K 9/52 |
| 2018/0276488 | A1* | 9/2018 | Yoo | G06K 9/00228 |
| 2018/0285668 | A1* | 10/2018 | Li | G06K 9/6269 |
| 2018/0336390 | A1* | 11/2018 | Liu | G06K 9/0004 |
| 2019/0065875 | A1* | 2/2019 | Sheikh Faridul | G01S 15/04 |
| 2019/0102608 | A1* | 4/2019 | Wang | H04N 5/23219 |
| 2019/0258841 | A1* | 8/2019 | Rasmussen | G06F 21/32 |

FOREIGN PATENT DOCUMENTS

| | | |
|---|---|---|
| WO | WO 2016/204968 | 12/2016 |
| WO | WO 2017/025573 | 2/2017 |

OTHER PUBLICATIONS

McKerrow et al. "Classifying Still Faces with Ultrasonic Sensing", Robotics and Autonomous Systems, XP055542490, 55(9): 702-710, Sep. 2007.

Patents Act 1977: Search Report Under Section 17(5) dated Jan. 30, 2018 From the Intellectual Property Office of the United Kingdom of Great Britain Re.

Patents Act 1977: Search Report Under Section 17(5) dated Jan. 31, 2018 From the Intellectual Property Office of the United Kingdom of Great Britain Re.

* cited by examiner

VERIFICATION METHOD AND SYSTEM

RELATED APPLICATIONS

This application claims the benefit of priority of United Kingdom Patent Applications Nos. 1713469.3 and 1713471.9 both filed Aug. 22, 2017, the contents of which are incorporated herein by reference in their entirety.

FIELD AND BACKGROUND OF THE INVENTION

The present invention relates to a method of verifying that (or determining whether) a biometric feature of a live human is present. More particularly, the present invention relates to a method of verifying that (or determining whether) a biometric feature of a live human is present for use as part of a biometric recognition system and/or method. The invention extends to a corresponding apparatus and system.

Biometric authentication, identification, and verification systems are used in a variety of applications (including surveillance, access control, gaming and virtual reality, and driver monitoring systems) as a way of verifying the identity of a user.

Biometric systems typically involve enrolling an authorised user's biometric feature(s) (e.g. the user's face, fingerprints, teeth, or iris) in a database, and, at a later time, automatically matching the authorised user's face presented to the system against one or more entries in the database based on a calculated index of similarity.

Such systems may be vulnerable to 'spoof' or 'presentation' attacks, in which an attacker claims an authorised user's identity by presenting a falsified biometric feature of the authorised user to the system, for example by use of a mask, a photograph, a video, or a virtual reality representation of the authorised user's biometric feature. This may mean that otherwise accurate biometric systems suffer from security risks.

Existing techniques for mitigating the risks of presentation attacks often require the cooperation and/or knowledge of the user/attacker (as in the case of 'challenge-response' tests), which, once an attacker has knowledge of the required response, may be relatively easily overcome (i.e. any system incorporating the known techniques may be easy to 'spoof'). Furthermore, many existing techniques require specialised hardware, which may reduce the utility of such techniques.

Aspects and embodiments of the present invention are set out in the appended claims. These and other aspects and embodiments of the invention are also described herein.

SUMMARY OF THE INVENTION

According to at least one aspect described herein, there is provided a method for determining whether a biometric feature of a live human is present, comprising: using a camera, capturing visual data of a presented biometric feature; transmitting a signal towards the biometric feature; using a sensor, capturing data related to a reflected signal from the presented biometric feature; and determining whether the visual data and the reflected signal data relate to a biometric feature having realistic dimensions thereby to determine that a live biometric feature is present.

By determining whether the data relates to a biometric feature having realistic dimensions, a live biometric feature can be determined to be present without the need for any active response from a user.

Optionally, determining whether the visual data and the reflected signal data relate to a biometric feature having realistic dimensions comprises determining whether the visual data and the reflected signal data in combination relate to a biometric feature having realistic dimensions. The visual data may relate to an angular size of the presented biometric feature and the reflected signal data may relate to a distance of the presented biometric feature from the sensor and/or the shape of a presented biometric feature.

Determining whether the visual data and the reflected signal data relate to a biometric feature having realistic dimensions may comprise comparing the visual data and the reflected signal data against a model related to realistic dimensions of a biometric feature. The model may relate to a ratio of angular size and distance from the sensor for a live biometric feature. The method may further comprise collecting data for use in the model, wherein the data for use in the model may comprise visual data and reflected signal data of a biometric feature of a live human and visual data and reflected signal data of a falsified biometric feature of a live human. The model may be a trained classifier, which may be trained based on presented biometric features of live humans and presented falsified biometric features of live humans. Optionally, the model comprises a convolutional neural network.

Optionally, data related to the presented biometric feature is transmitted for remote processing. Optionally, transmitting a signal comprises transmitting a signal in accordance with a predetermined pattern. The pattern may be formed from at least one pulse and at least one pause, and may be configured such that at least one pulse in the reflected signal is received during the at least one pause in the transmitted signal. The pattern may be selected (optionally, randomly) from a plurality of patterns.

Transmitting a signal may comprise using a single transmitter. Optionally, a single sensor is used to capture data related to a reflected signal.

Optionally, the biometric feature is one or more of: a face; a hand; a palm; a thumb; and one or more fingers. The method may further comprise, using a screen, presenting the captured visual data to the presented biometric feature. A live human may be instructed (using the screen) to locate the biometric feature at a particular position relative to the camera and/or the sensor and/or to perform a particular gesture with the biometric feature.

The sensor may be a microphone, and the signal may be a sound wave (preferably, an ultrasound wave). The frequency of the ultrasound wave may be randomly selected within a predetermined range.

The method may form part of a multi-modal method for determining whether a biometric feature of a live human is present.

According to at least one aspect described herein, there is provided a method for determining whether a biometric feature of a live human is present, comprising: using a camera, capturing visual data of a presented biometric feature, wherein the visual data relates to an angular size of the presented biometric feature; transmitting a signal towards the biometric feature; using a sensor, capturing data related to a reflected signal from the presented biometric feature, wherein the reflected signal data relates to a distance of the presented biometric feature from the sensor; and comparing the visual data and the reflected signal data against a model related to possible angular sizes and possible distances from the sensor for a live biometric feature thereby to determine that a live biometric feature is present.

According to at least one aspect described herein, there is provided a method of verifying the identity of a user, comprising performing a method as described herein; and verifying the identity of the user by comparing biometric information of the user (which optionally comprises information related to the user's biometric feature(s)) against a database of biometric information of verified users.

According to at least one aspect described herein, there is provided apparatus for determining whether a biometric feature of a live human is present, comprising: a camera for capturing visual data of a presented biometric feature; a module adapted to transmit a signal towards the biometric feature; a sensor for capturing data related to a reflected signal from the presented biometric feature; and a module whether the visual data and the reflected signal data relate to a biometric feature having realistic dimensions thereby to determine that a live biometric feature is present.

The module adapted to transmit a signal may be a loudspeaker; and the signal may be an ultrasound signal. The sensor for capturing data related to a reflected signal may be a microphone. The apparatus may be in the form of one or more of: a smartphone; a laptop computer; a desktop computer; or a tablet computer; an automated passport control gate; and an entry system.

According to at least one aspect described herein, there is provided a system for determining whether a biometric feature of a live human is present, comprising: a user device, comprising: a camera for capturing visual data of a presented biometric feature; a module adapted to transmit a signal towards the biometric feature; and a sensor for capturing data related to a reflected signal from the presented biometric feature; and a remote determination module adapted to determine whether the visual data and the reflected signal data relate to a biometric feature having realistic dimensions thereby to determine that a live biometric feature is present.

According to at least one aspect described herein, there is provided a method for determining whether a biometric feature of a live human is present, comprising: using a sensor, capturing data related to a presented biometric feature; applying a stimulus to the presented biometric feature, wherein the stimulus is capable of causing an involuntary response from a biometric feature of a live human; and determining whether the data indicates that the involuntary response has occurred thereby to determine whether a biometric feature of a live human is present.

By determining whether an involuntary response has occurred, a live biometric feature can be determined to be present without the need for any active (i.e. voluntary) response from a user.

Applying a stimulus may comprise transmitting a signal, wherein the signal may be adapted to cause an involuntary response from a biometric feature of a live human. Optionally, transmitting a signal comprises transmitting a signal in accordance with a predetermined pattern. Determining whether the data indicates that the involuntary response has occurred may comprise determining whether a pattern corresponding to the predetermined pattern is present in the captured data. The pattern may be formed from at least one pulse and at least one pause, and may be selected from a plurality of patterns. Optionally, the pattern is randomly selected.

The transmitted signal may be detected using a further sensor. Determining whether the data indicates that the involuntary response has occurred may comprise comparing data from the sensor and the further sensor and/or applying a time correction to data from the sensor and data from the further sensor. The further sensor may be a microphone, and the signal may comprise a sound wave (preferably, an ultrasound wave).

Optionally, the involuntary response is a movement of at least part of the biometric feature. The sensor may be a camera, and the captured data may be visual data. Determining whether the data indicates that the involuntary response has occurred may comprise determining whether the visual data includes rolling shutter artefacts indicative of the movement of at least part of the biometric feature. The movement may be generally elastic, and preferably has a maximum extent of less than 2 mm, more preferably less than 1 mm, still more preferably less than 0.5 mm, and most preferably less than 0.2 mm.

The biometric feature may be a head. The movement may be a movement of one or more of: hair; and facial skin. The method may further comprise identifying features on the presented biometric feature where movement is expected to occur and/or magnifying a pre-determined frequency band corresponding to a frequency of the movement of at least part of the biometric feature.

Optionally, determining whether the data indicates that the involuntary response has occurred comprises comparing data captured using the sensor while the stimulus is applied to data captured using the sensor while the stimulus is not applied.

Optionally, determining whether the data indicates that the involuntary response has occurred comprises comparing data captured using the sensor against a model, wherein the model represents an involuntary response of a live human to the stimulus. Data related to an involuntary response of a biometric feature of a live human to the stimulus and a response of a falsified biometric feature of a live human may be collected for use in the model. The model may be a trained classifier, which may be trained based on presented biometric features of live humans and presented falsified biometric features of live humans. The model may comprise a convolutional neural network. Data related to the presented biometric feature may be transmitted for remote processing.

Captured visual data may be presented to the presented biometric feature using a screen.

The method may form part of a multi-modal method for determining whether a biometric feature of a live human is present.

According to at least one aspect described herein, there is provided a method of verifying the identity of a user, comprising performing a method as described herein; and verifying the identity of the user by comparing biometric information of the user (which optionally comprises information related to the user's biometric feature(s)) against a database of biometric information of verified users.

According to at least one aspect described herein, there is provided apparatus for determining whether a biometric feature of a live human is present, comprising: a sensor for capturing data related to a presented biometric feature; a module adapted to apply a stimulus to the presented biometric feature, wherein the stimulus is capable of causing an involuntary response from a biometric feature of a live human; and a module adapted to determine whether the data indicates that the involuntary response has occurred thereby to determine whether a biometric feature of a live human is present.

The sensor may be a camera; and the captured data may be visual data. The module adapted to transmit a signal may be a loudspeaker; and the signal may be an ultrasound signal. The apparatus may further comprise a microphone for detecting the transmitted signal. The apparatus may be in the form of one or more of: a smartphone; a laptop computer; a desktop computer; or a tablet computer; an automated passport control gate; and an entry system.

According to at least one aspect described herein, there is provided a system for determining whether a biometric feature of a live human is present, comprising: a user device, comprising: a sensor for capturing data related to a presented biometric feature; and a module adapted to apply a stimulus to the presented biometric feature, wherein the stimulus is capable of causing an involuntary response from a biometric feature of a live human; and a remote determination module adapted to determine whether the data indicates that the involuntary response has occurred thereby to determine whether a biometric feature of a live human is present.

According to at least one aspect described herein, there is provided a method of perturbing an object using a user device, comprising, using a loudspeaker of the user device, transmitting an ultrasound signal towards the object. The method may further comprise, using a camera, detecting a perturbation of the object in response to the ultrasound signal.

The invention extends to methods, system and apparatus substantially as herein described and/or as illustrated with reference to the accompanying figures.

The invention also provides a computer program or a computer program product for carrying out any of the methods described herein, and/or for embodying any of the apparatus features described herein, and a computer readable medium having stored thereon a program for carrying out any of the methods described herein and/or for embodying any of the apparatus features described herein.

The invention also provides a signal embodying a computer program or a computer program product for carrying out any of the methods described herein, and/or for embodying any of the apparatus features described herein, a method of transmitting such a signal, and a computer product having an operating system which supports a computer program for carrying out the methods described herein and/or embodying any of the apparatus features described herein.

Any feature in one aspect of the invention may be applied to other aspects of the invention, in any appropriate combination. In particular, method aspects may be applied to apparatus aspects, and vice versa. As used herein, means plus function features may be expressed alternatively in terms of their corresponding structure, such as a suitably programmed processor and associated memory.

Furthermore, features implemented in hardware may generally be implemented in software, and vice versa. Any reference to software and hardware features herein should be construed accordingly.

As used herein, the term 'biometric feature' preferably connotes a part or characteristic of a human body which can be used to identify a particular human.

As used herein, the term 'live human' preferably connotes a living human being (i.e. not a recording or any other kind of indirect representation of a living human).

As used herein, the term 'head' preferably connotes a human head, including the face and hair. As used herein, the term 'face' is to be preferably understood to be interchangeable with the term 'head'.

As used herein, the term 'loudspeaker' preferably connotes any electroacoustic transducer for transmitting sound waves. As used herein, the term 'microphone' refers to connotes any electroacoustic transducer for receiving sound waves.

As used herein, the term 'audio' preferably connotes sound, including both audible frequencies and ultrasound frequencies.

As used herein, the term 'ultrasound' preferably connotes sound having a frequency above 18 kHZ (which is barely perceptible, or not perceptible, for the majority of humans), more preferably between 18 KHz to 22 Khz or alternatively between 20 kHz and 30 MHz.

As used herein, the term 'realistic' preferably connotes that an article (which may or may not be real) has characteristics corresponding to a real article.

As used herein, the term 'dimension' preferably connotes a measurable characteristic of an article (such as the size of an article) or a measurable characteristic of a relationship between an article and another article (such as the distance between two articles).

As used herein, the term 'angular size' preferably connotes one or more apparent dimensions of an object from a given point of view, preferably one or more apparent dimensions of an object within a field of view of a camera.

As used herein, the term 'involuntary' preferably connotes an action that is not consciously controlled.

It should also be appreciated that particular combinations of the various features described and defined in any aspects of the invention can be implemented and/or supplied and/or used independently.

BRIEF DESCRIPTION OF THE SEVERAL VIEWS OF THE DRAWINGS

The invention will now be described, purely by way of example, with reference to the accompanying drawings, in which.

DESCRIPTION OF SPECIFIC EMBODIMENTS OF THE INVENTION

Figure 1:
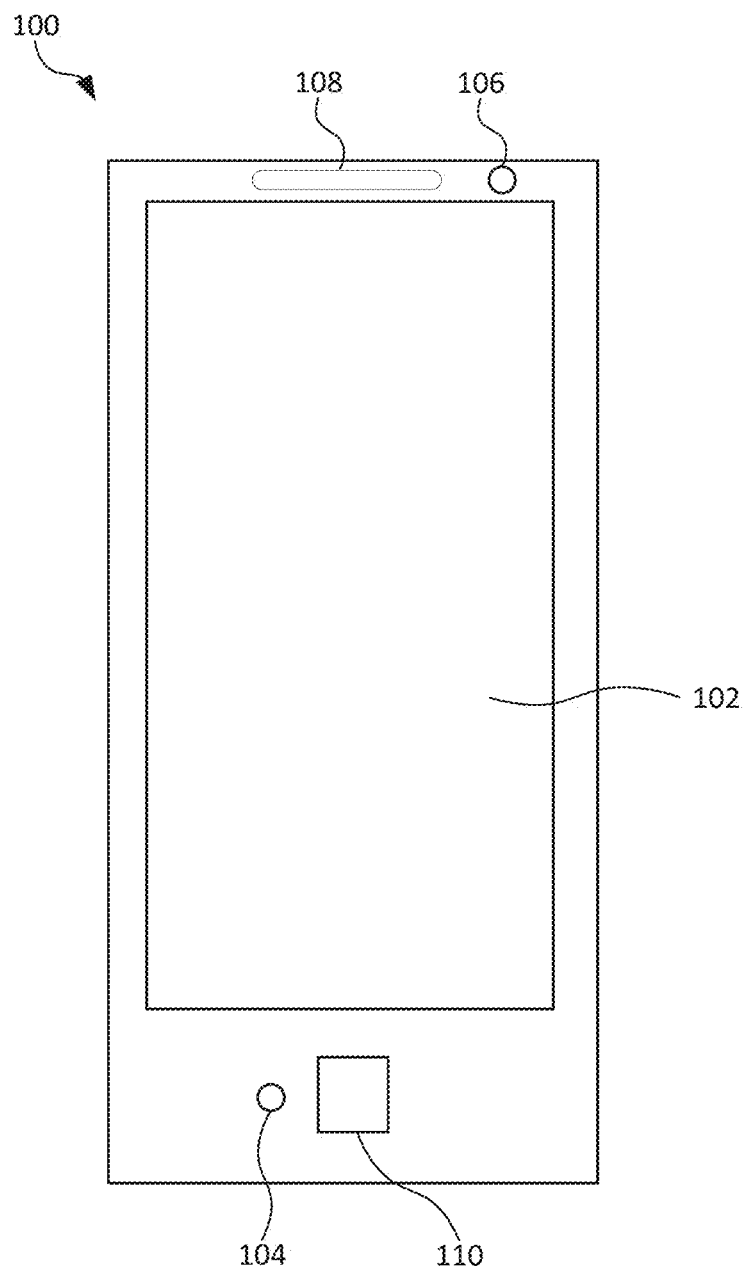
FIG. 1 is a schematic depiction of a typical portable user device in the form of a smartphone.

FIG. 1 is a schematic depiction of a typical portable user device 100 in the form of a smartphone. As is well known, the user device 100 comprises a screen 102 and a loudspeaker 108 for providing information to a user, as well as a number of sensors arranged around the screen for receiving inputs from a user. In particular, the sensors include a front-facing camera 106 (i.e. a camera which faces towards the user as the user views the screen 102—a further rear-facing camera (not shown) may also be provided) for receiving visual data, particularly visual data relating to the user, a microphone 104 for receiving audio data, particularly from the user, and one or more buttons 110 (or similar input device) for receiving a physical input from the user.

The present invention provides methods 200, 800 for determining whether a biometric feature of a live human is present (i.e. whether a part of a purported user presented to the sensors of the user device is actually a part of a real human) which is suited to be implemented using the user device 100. The methods 200, 800 may find particular use as an initial stage (or initial stages) in biometric recognition systems in order to defend such systems against presentation attacks.

First Method

Figure 2:
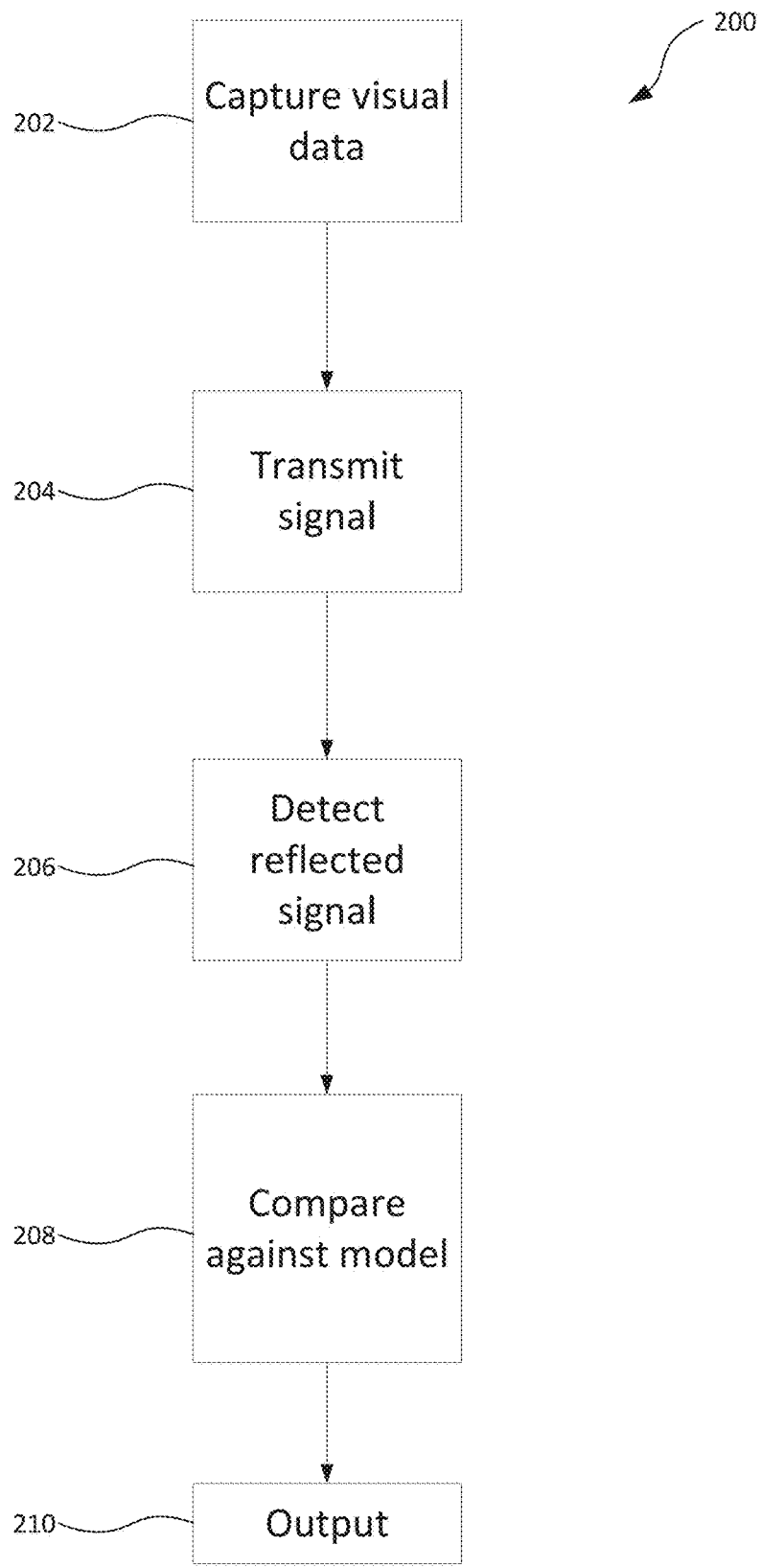
FIG. 2 is a flowchart which illustrates the main steps of a method for determining whether a biometric feature of a live human is present.

FIG. 2 is a flow diagram which illustrates the main steps of a first method 200 for determining whether a biometric feature of a live human is present. As mentioned, in an embodiment, the method 200 is implemented on a user device 100 in the form of a smartphone, although it will be appreciated that other implementations are of course possible.

In a first step 202, the camera 106 of the user device is used to capture visual data of a (purported) biometric feature which is presented to the camera 106 and screen 102. The biometric feature may be a real biometric feature of a live human or a falsified or fraudulent biometric feature, such as a printed photograph (or other image), a photograph or video displayed on a screen of an external display device (such as another user device), or a fake 3D recreation of a biometric feature (such as a mask of a face, or a silicon mould of a fingerprint). In an embodiment, the biometric feature is a human head, although it will be appreciated that other implementations are of course possible. Specifically, the visual data is a photograph or image of the presented biometric feature.

In a second step 204, a signal is transmitted towards the presented biometric feature for the purposes of range finding (i.e. measuring a distance between the user device and the presented biometric feature). The signal is in the form of an ultrasound signal (i.e. a sound wave having a frequency above 18 kHz, such that it is barely perceptible or not perceptible to most humans), which is transmitted from the loudspeaker 108 of the user device. The signal is transmitted in accordance with a predetermined pattern, which is formed from a series of pulses (or bursts) and pauses.

The ultrasound signal is reflected off objects in the vicinity, including the presented head. In the vast majority of uses, the only object of significance in the vicinity of the loudspeaker 108 is the presented head. As will be appreciated, the loudspeaker 108 is located in the user device 100 such that it is directed towards the presented head, which may improve the transmission of the ultrasound signal towards the presented head.

In a third step 206, the ultrasound signals are detected using the microphone 104 of the user device 100. The microphone 104 is turned on throughout the time period over which the ultrasound signal is transmitted (and optionally for a further time period once the transmission of the ultrasound signal has ceased). Audio data including the detected ultrasound signals is produced by the microphone 104.

Figure 3:
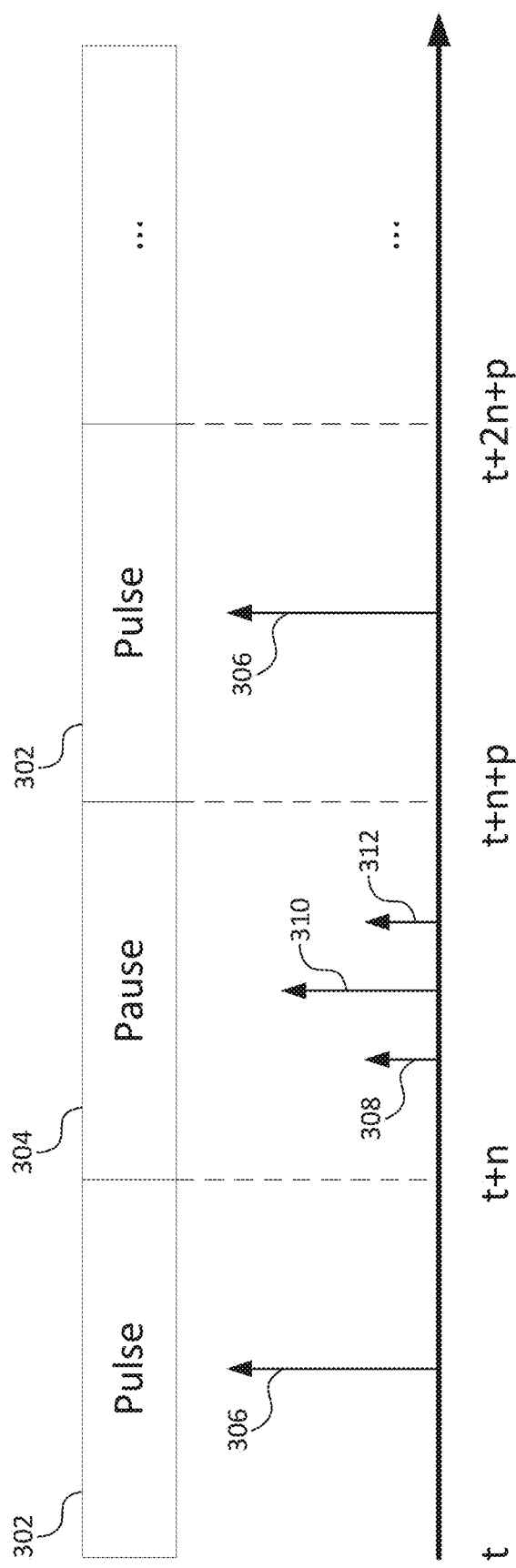
FIG. 3 is an image showing the pattern of the transmitted signal and the signals included in the audio data received by the microphone in the method of FIG. 2.

FIG. 3 is an image showing the pattern of the transmitted signal and the signals included in the audio data received by the microphone 104. The pattern of the pulses and pauses is selected such that reflected pulses are received at the microphone 104 during a pause in the transmitted signal pattern.

The transmission of an ultrasound pulse 302 of duration n commences at time t. A first peak 306 in the received signal at the microphone 104 occurs while the ultrasound pulse is transmitted, corresponding to the transmitted signal directly (i.e. with minimal reflections from other objects). A pause 304 of duration n follows the pulse. In the pause period, secondary peaks 308, 310, 312 are detected in the received signal. The secondary peaks correspond to different objects from which reflected ultrasound signals are received. Since, in general terms, the presented head is the largest and most prominent object in the vicinity of the user device 100 the largest secondary peak 310 corresponds to a reflected signal from the presented head. A delay d between the first peak 306 and the largest secondary peak 310 corresponds to the distance between the object and microphone. At time t+n+p, another pulse is transmitted, and another peak corresponding to the first peak 306 is received. The pause time p is calibrated the first time the method 200 is used based on the distance between the microphone and the loudspeaker to improve the accuracy of range estimation. The pulses and pauses continue until the transmitted ultrasound signal is terminated. Since only the largest secondary peak 310 corresponds to the presented head, the other secondary peaks may be removed so as to avoid interference in later analysis, for example by applying a threshold to the audio data.

Optionally, the frequency of the ultrasound pulse 302 is chosen at random (within a predetermined range), in order to avoid interference with similar nearby devices 100 implementing the method 200 and to increase the security of the method 200. As mentioned, signals corresponding to other frequencies may be removed (for example, if the loudspeaker generates 21.75 KHz, all other frequencies other than 21.75 KHz are filtered out before the reflected secondary peaks are analysed).

The amplitude of the secondary peaks can be used to infer information about the shape of the object from which the ultrasound signals are reflected. For example, a large amplitude may indicate that the received signal has been reflected from an object having a large flat surface (such that the reflected signal is not very dispersed), such as a user device, a display, or a piece of paper or card (such as a physical photograph). In contrast, signals reflected from a partially curved object or an object having various protrusions and indentations (such as a human head) have smaller amplitudes and longer durations.

Optionally, once the transmission of the signal has stopped, the camera 106 and the microphone 104 may be switched off in order to save on battery power and data storage requirements of the user device 100.

In a fourth step 208, the visual data and the audio data are compared against a model. Such comparison may be performed using a processor of the user device 100, or via an external server (in which case the visual data and the audio data, or a processed version thereof, are transmitted from the user device 100 to the external server).

The model used in the comparison step 208 is a binary classifier, which is arranged to receive the visual data and the audio data and produce an output indicating that the presented biometric feature is either verified or is not verified. The model is trained to recognise features in the visual data and the audio data which are indicative of a live human face being present, in particular whether the audio data and the visual data correspond in such a way that a combination of features in the audio data and the visual data are indicative of a live human face being present.

In particular, the model relates to acceptable dimensions of the presented biometric feature (i.e. dimensions that correspond to 'realistic' dimensions of a live biometric feature), where the dimensions include the angular size of the presented biometric feature (i.e. the apparent size of the presented biometric feature within the 'frame' or field of view of the camera, as determined via the visual data), the distance from the user device 100 (as determined via the delay d between the first peak 306 and the largest secondary peak 310 in the audio data) and the shape of the presented biometric feature (as determined via the amplitude of the secondary peaks in the audio data). Optionally, further dimensions are used in the model—for example, dimensions related to the position of the presented biometric feature within the field of view of the camera.

As will be appreciated, the method 200 thereby acts on the inability of falsified 2D representations to correctly represent the dimensions of a real biometric feature, as the angular size and distance from the user device 100 will generally be out of realistic proportions. For small representations such as a displayed falsified biometric representation on the screen of a user device, the falsified representation will always be detected to have too small an angular size to be a real biometric feature given the detected distance from the user device. Large representations provided on, for example, a large display may have realistic proportions as judged from the angular size and the distance from the user device 100, but the reflected ultrasound signal will show peaks with very high amplitudes. This allows the falsified representation to be detected, even if the proportions of the angular size and distance from the user device are within realistic proportions.

Before comparison against the model, the visual data and audio data are pre-processed using scaling methods. This may improve the model's ability to recognise particular features in the data.

In a fifth step 210, an output is produced by the model in dependence on the results of the comparison in the fourth step 208. The output may take the form of a message indicating that a real human (or a real human head) has been verified or has not been verified.

Figure 4:
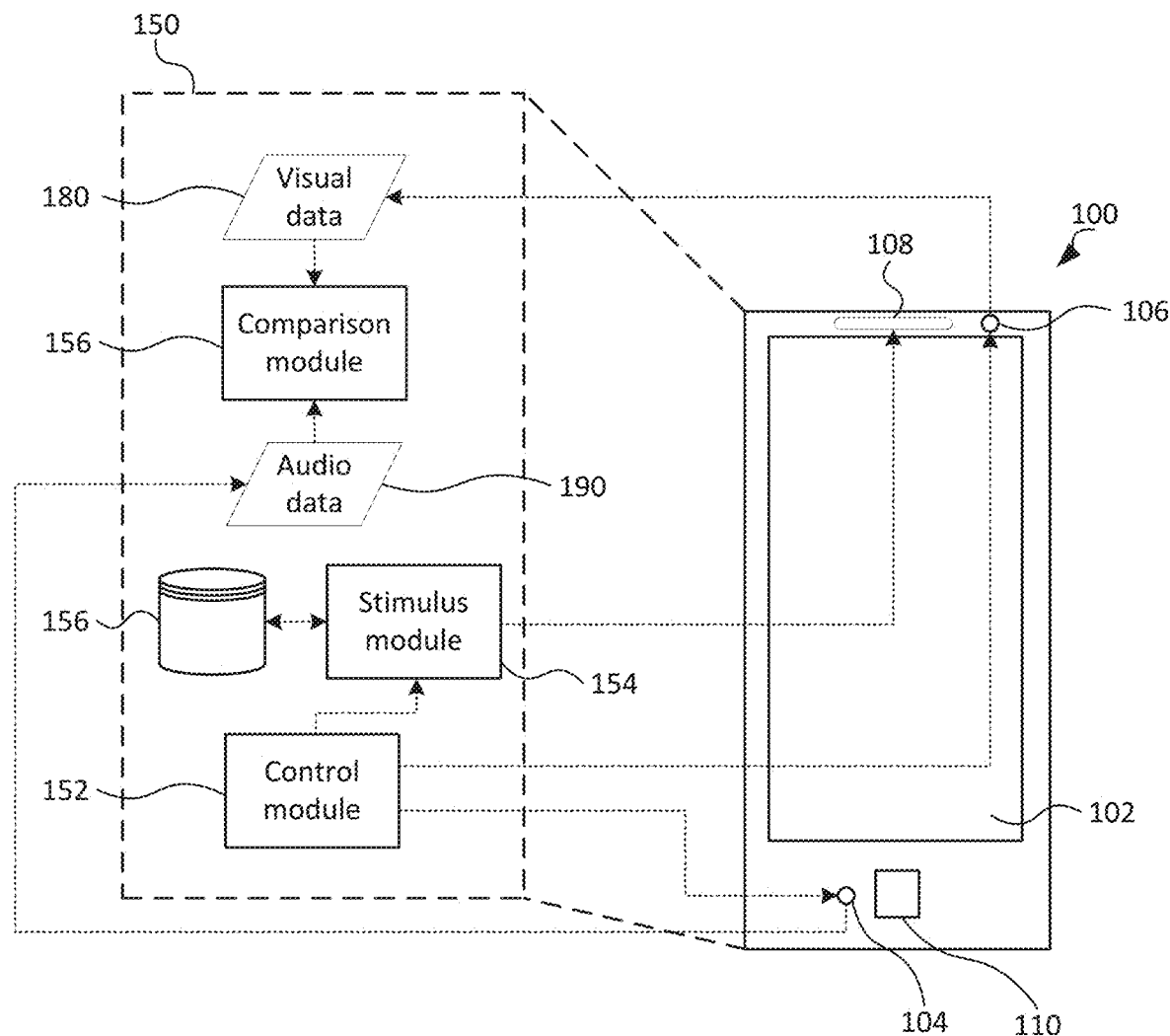
FIG. 4 is a schematic diagram of a software architecture (including memory) of a user device adapted to implement the method of FIG. 2.

Referring to FIG. 4, a schematic diagram of the software architecture 150 (including memory) of the user device 100 adapted to implement the method 200 is shown. As illustrated, this includes a control module 152 for controlling the camera 106 and the microphone 104, a stimulus module 154 (also controlled by the control module 152) for generating a pattern and for controlling the loudspeaker 108 to transmit the ultrasound signal including the pattern, a data store 156 provided in communication with the stimulus module 154, and a comparison module 156 for receiving visual data 180 from the camera 106 and audio data 190 from the microphone 104. Optionally, the visual data 180 and audio data 190 (or alternatively processed forms of said data produced by the comparison module 156) are saved into the data store 15, once received.

The particular frequency of the ultrasound signal used in dependence on the hardware of the user device 100. A built-in loudspeaker of a smartphone can typically generate ultrasound of frequencies between 18 KHz and 22 KHz, and a built-in microphone of a smartphone can typically detect frequencies between 18 KHz and 22 KHz. As such, where the user device 100 is a smartphone, frequencies between 18 KHz and 22 KHz may be used.

The control module 152 is arranged to implement the visual data capturing step 202 of the method by turning the camera on in response to a signal from a processing component of the user device 100 (or alternatively an external signal), where the signal indicates that there is a need to determine whether a biometric feature of a live human is present. The control module 152 is also arranged to implement the signal transmission step 204 in part, in that it directs the stimulus module 154 to generate and transmit a signal. Similarly, the control module is also arranged to implement the signal transmission step 204 in part, in that it turns the microphone 104 on (optionally, at the same time as the camera is turned on).

The stimulus module 154 selects a pattern for the signal on the basis of data relating to a plurality of patterns in the data store. The plurality of patterns may differ in the duration and/or number of the pulses and/or the pauses in a single pattern. Furthermore, a variety of different types of signal may be used as the 'pulse' in the pattern; options include a sine sweep (for example, from around 18 KHz to 22 KHz), a pulsed ultrasound (for example, of around say 20 KHz), or a white noise. The stimulus module 154 may select the pattern in accordance with a cycle of various predetermined patterns, but preferably instead selects the pattern randomly (which may provide added security). In an alternative, the pattern is generated dynamically based on a plurality of variables (such as pause duration, pulse duration, and pulse signal type), which are determined dynamically or randomly. In all cases, the pattern of the signal (as well as the power characteristics of the signal) is selected such that reflected pulses from objects within a predetermined frequency and distance range are received at the microphone 104 during a pause of the pattern. The reflected frequency range is typically within +−200 Hz of the original ultrasound signal. For example, if the original ultrasound pulse has a frequency of 19.5 kHz and a duration of 100 ns, the reflected ultrasound is expected to have a frequency of between 19.3 kHz and 19.7 kHz and a duration of 100 ns. All other noise is removed using a bandpass filter.

It will be appreciated that transmitting signals according to a pattern (which consequently appears in, or otherwise affects, the received reflected signals) adds a further layer of security, as it protects against attacks in which an attacker transmits a recorded ultrasound pattern. An attacker will not be able to produce a signal having a pattern corresponding to the transmitted pattern unless they are able to predict the pattern of the transmitted ultrasound signal.

The comparison module 156 comprises the previously described model, which may optionally be stored in the data store. As mentioned, in an alternative, the comparison may be performed using an external server, where the binary classifier is provided on the external server. In such a case, the extracted binary signals may be transmitted to the external server from the comparison module 156 over a data connection, and an output may be transmitted back to the user device once the comparison has been performed.

Figure 5:
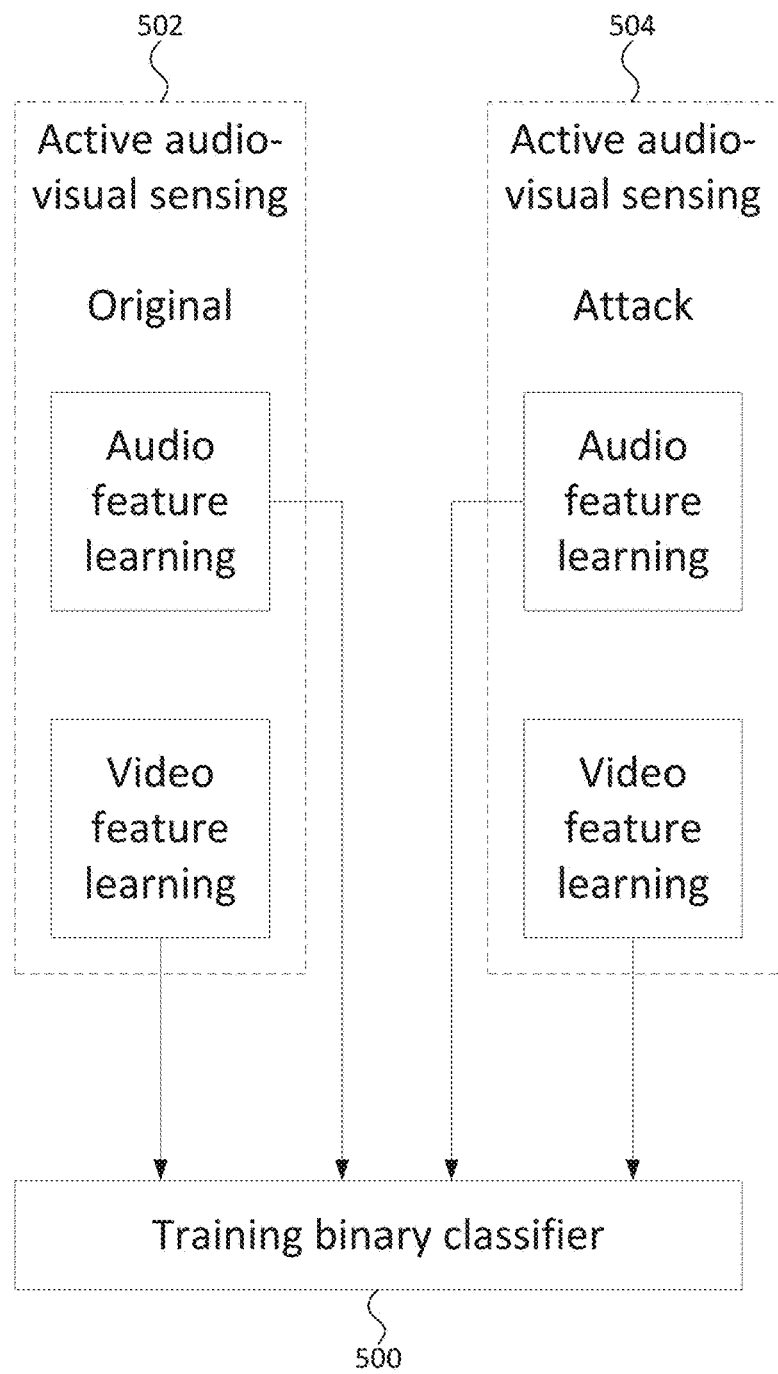
FIG. 5 is an image showing a method of training a binary classifier for use in the method of FIG. 2.

FIG. 5 is an image showing a method of training a binary classifier 500 for use in the method 200. In use, the classifier receives the audio data and the visual data as an input and produces a binary output based on its training. The classifier is trained based on the audio data and the visual data alone, using feature learning with a convolutional neural network. This allows the classifier to learn important features, and which are then detected in use. The classifier 500 is trained on the basis of original data 502 from presented live human faces as well as 'attack' data 504 from falsified human faces.

Figure 6A:
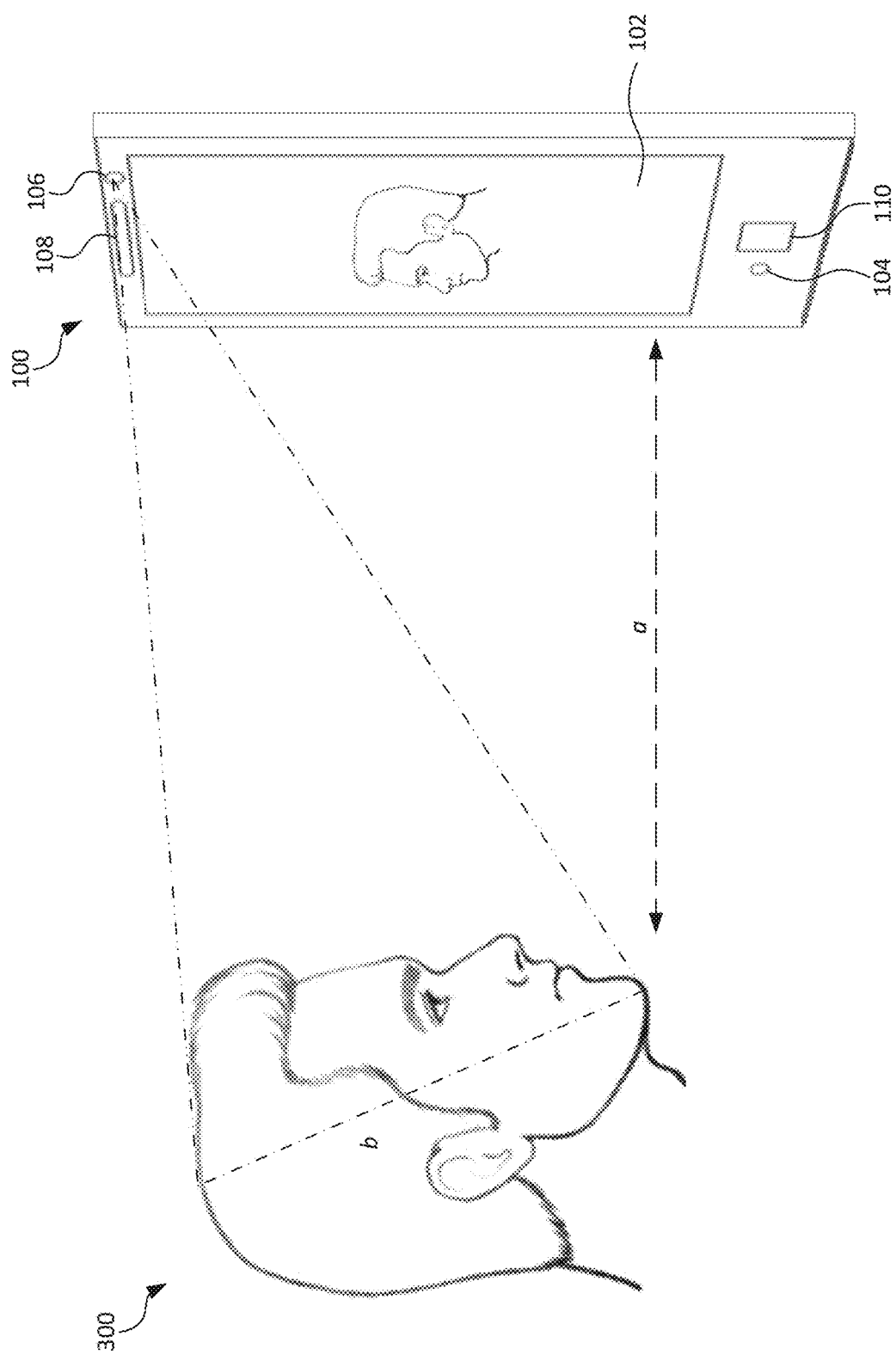
FIG. 6a is a schematic depiction of the user device performing the method of FIG. 2 on a live human face.

FIG. 6a is a schematic depiction of the user device 100 performing the method 200 on a live human face 300. As shown, the ultrasound signal transmitted by the microphone 104 and received via the loudspeaker 108 allows a distance a between the face 300 and the user device 100 to be determined. The camera 106 allows determination of the angular size b of the face 300.

The screen 102 of the user device 100 presents an image 112 of the presented head (where the image data is acquired via the camera)—this may assist a human attempting to verify themselves to the system to hold the user device at an appropriate orientation and distance relative to their presented face (in particular so that the entirety of the presented face is in the frame of the camera).

Figure 6B:
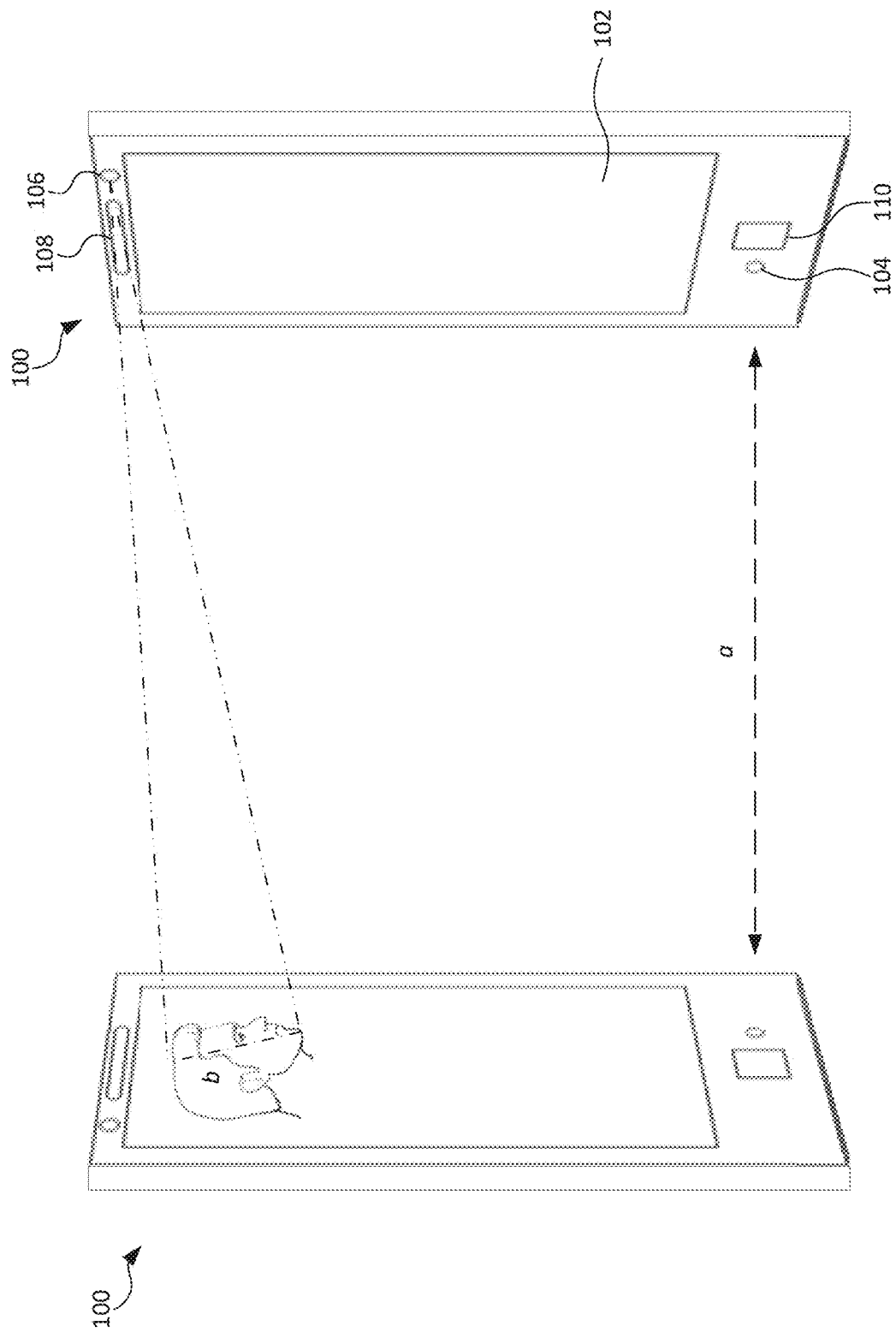
FIG. 6b is a schematic depiction of the user device performing the method of FIG. 2 on a falsified human face presented on another user device.

FIG. 6b is a schematic depiction of the user device 100 performing the method 200 on a falsified human face, which is presented on another user device 100. The ultrasound signal is transmitted and received as before and visual data is received via the camera 106, but the angular size a is out of proportion with the distance b from the user device 100—so the presented face is determined to be falsified.

Alternatives and Extensions for First Method

As an alternative to capturing video via the camera, a plurality of photographs may instead be captured and used in subsequent analysis.

Optionally, an alternative ultrasound transducer is used to transmit and/or receive ultrasound signals, rather than the loudspeaker 108 and/or microphone 104 of the user device 100. The transducer may, for example, be provided as part of separate apparatus.

Although the invention has principally been defined with reference to the transmitted signal being an ultrasound signal, it will be appreciated that a variety of alternative signals may be used, where the signal is used for distance ranging. For example, a laser or infrared signal may be used.

Figure 7:
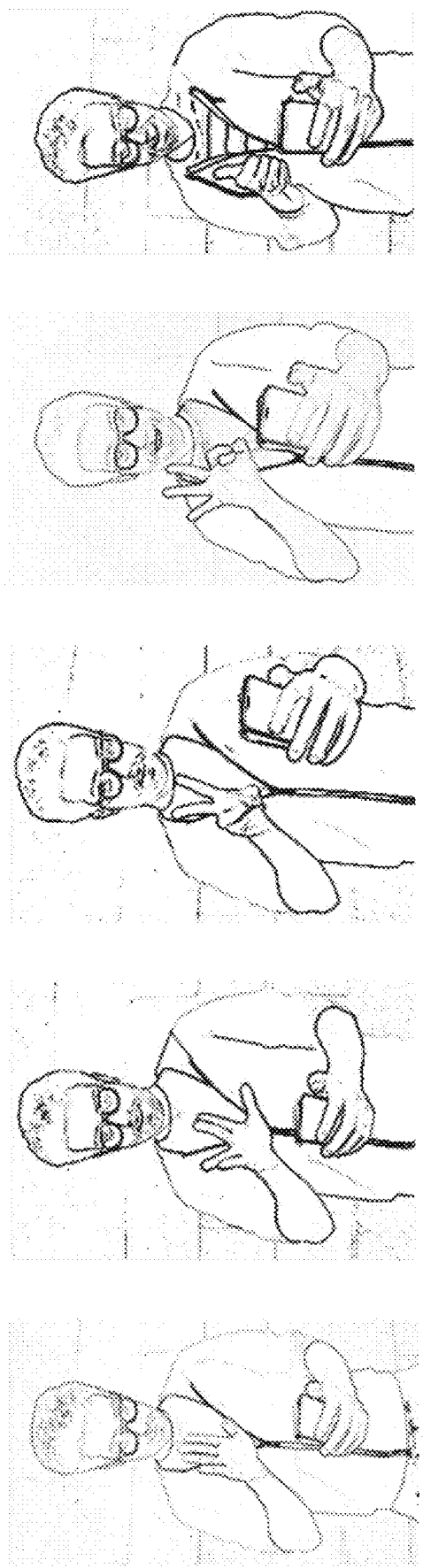
FIG. 7 is an image showing a sequence of gestures that a user may perform to verify themselves in the method of FIG. 2.

FIG. 7 is an image showing a sequence of gestures that a user may perform to verify themselves. The method 200 may be repeated for various biometric features, where the user is requested to present various biometric features in a gesture. The user may be requested to perform a sequence of gestures with the biometric features—each gesture acts to change the effective shape, distance from the user device, and angular size of the presented biometric feature (as the feature appears to the sensors of the user device), and so provides additional layers of security without requiring much input from a user.

Second Method

Figure 8:
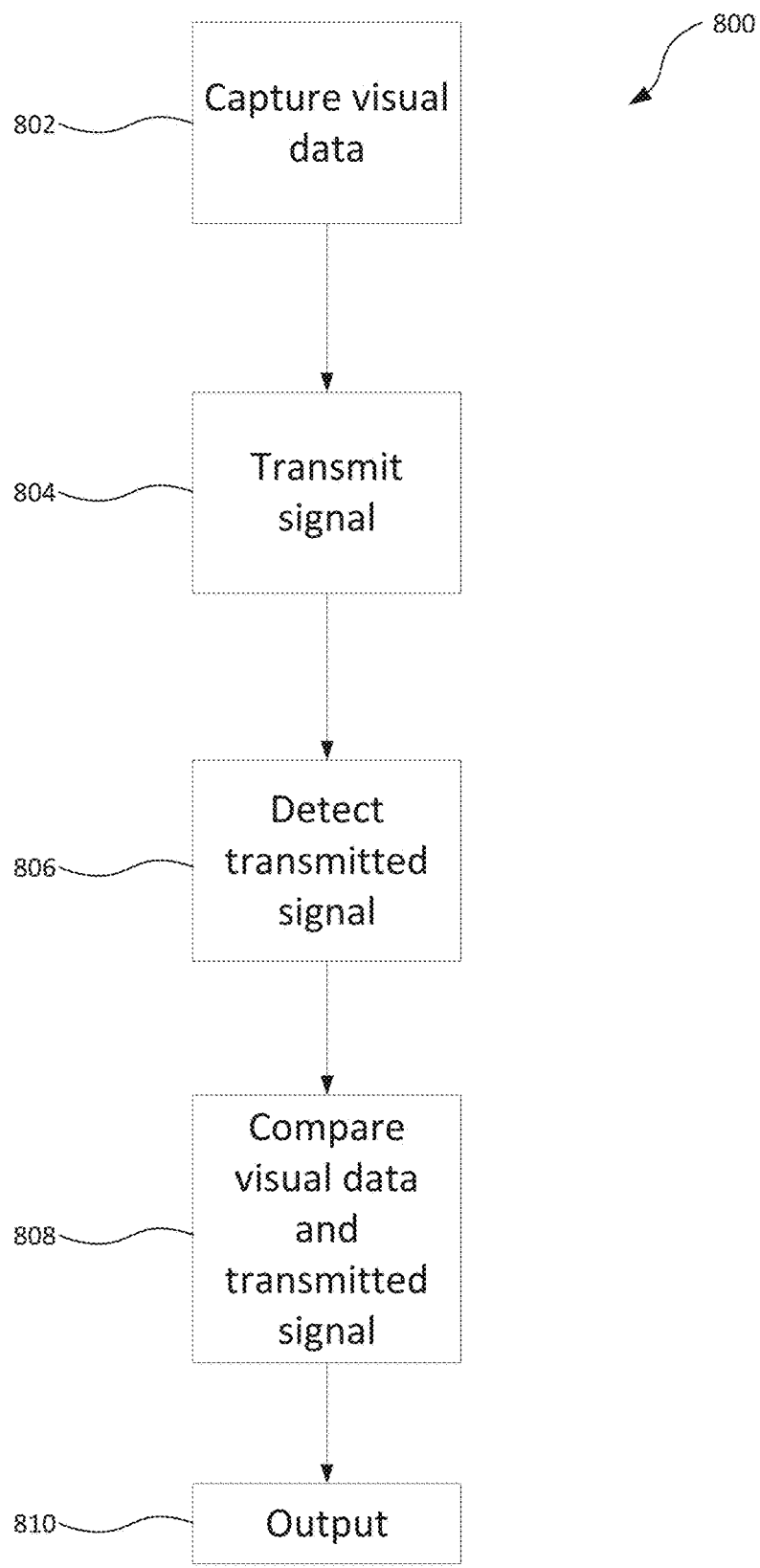
FIG. 8 is a flowchart which illustrates the main steps of a further method for determining whether a biometric feature of a live human is present.

FIG. 8 is a flow diagram which illustrates the main steps of a second method 800 for determining whether a biometric feature of a live human is present. In an embodiment, the method 800 is implemented on a user device 100 in the form of a smartphone, although it will be appreciated that other implementations are of course possible.

In a first step 802, the camera 106 of the user device is used to capture visual data of a (purported) biometric feature which is presented to the camera 106 and screen 102. The biometric feature may be a real biometric feature of a live human or a falsified or fraudulent biometric feature, such a printed photograph (or other image), a photograph or video displayed on a screen of an external display device (such as another user device), or a fake 3D recreation of a biometric feature (such as a mask of a face, or a silicon mould of a fingerprint). In an embodiment, the biometric feature is a human head, although it will be appreciated that other implementations are of course possible. The visual data is a video of the presented head, which is continually captured.

In a second step 804, a stimulus is applied to the presented biometric feature. The stimulus is in the form of an ultrasound signal (i.e. a sound wave having a frequency above 18 kHz, such that it is barely perceptible or not perceptible to most humans), which is transmitted from the loudspeaker 108 of the user device. The signal is transmitted in accordance with a predetermined pattern, which is formed from a series of pulses (or bursts) and pauses.

The ultrasound pulses perturb objects in the vicinity, including the presented head. In the vast majority of uses, the only object of significance in the vicinity of the loudspeaker 108 is the presented head. The perturbation may cause at least parts of the presented head to make an involuntary response in the form of small movements, which are detectable via the visual data. Such small movements may be referred to as 'micro-movements'. The micro-movements are included in the visual data that is captured via the camera 106. Micro-movements are high frequency, spatially tiny motions between frames in a video. Such movements are not detectable via the naked eye and may not be clearly identifiable via the camera itself. However, where a 'rolling shutter' image capture technique is used (i.e. an image is captured by rapidly scanning across a scene, rather than capturing the entire scene at a single instant in time), 'rolling shutter artefacts' are produced as a result of the faster movement of the micro-movements relative to the movement of the rolling shutter across the scene. The presence or absence of micro-movements may therefore be determined by the presence or absence of the relevant rolling shutter artefacts within captured visual data.

Importantly, the micro-movements are movements of a live human head or face under perturbation caused by ultrasonic bombardment, such that a falsified presented head (such as an image or a mask) does not show such micro-movements under ultrasonic bombardment (although such a falsified presented head may of course move in other ways under ultrasonic bombardment). As will be appreciated, the loudspeaker 108 is located in the user device 100 such that it is directed towards the presented head, which may improve the transmission of the ultrasound signal towards the presented head.

Figure 9:
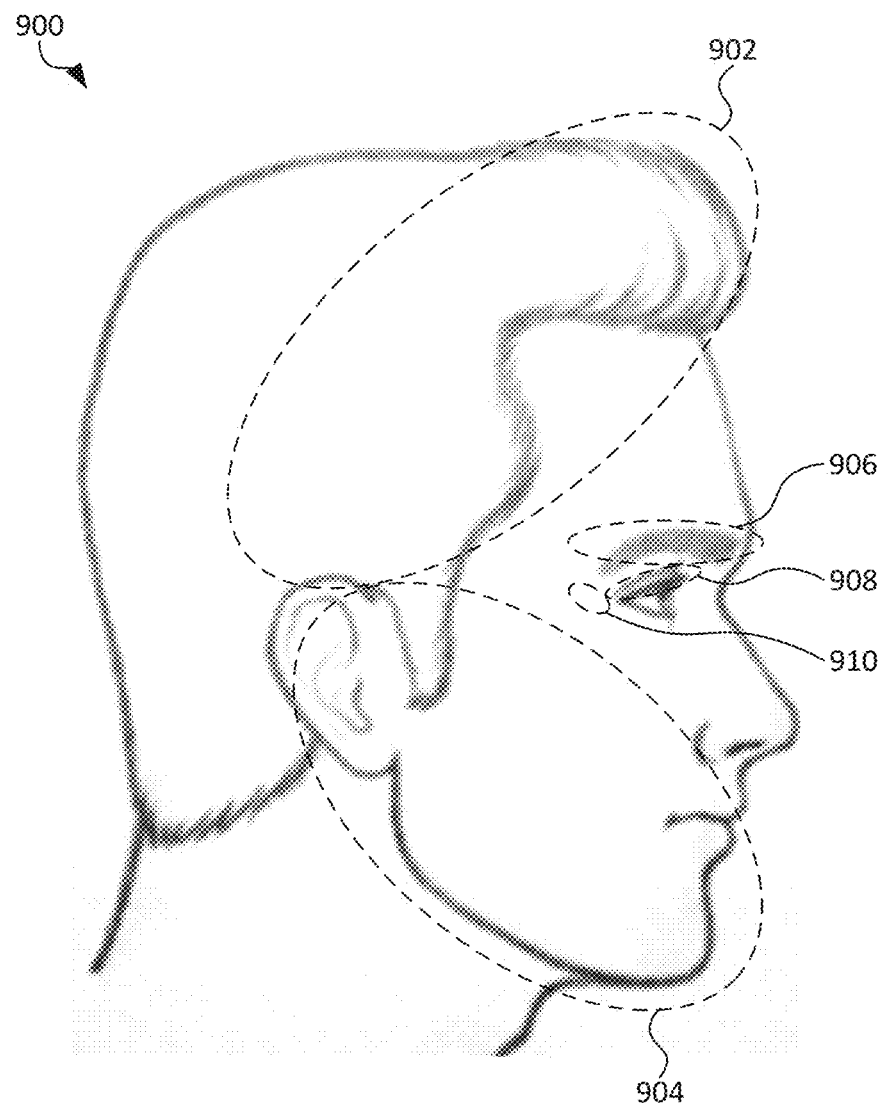
FIG. 9 is an image of a live human head.

FIG. 9 is an image of a live human head 900, where parts of the head which may exhibit detectable micro-movements are marked. Under ultrasonic bombardment (of a sufficient magnitude), the entire head is perturbed, but measurable movements only take place in more mobile parts of the head, in particular those parts with have a low mass.

Hair is typically a highly mobile part of the head which exhibits a relatively high level of movement under ultrasonic bombardment. Hair may be present in various areas of a human head and in various forms, including as head hair 902, facial hair 904 (not present on the example head shown in the figure), eyebrows 906, and eyelashes 908. As will be appreciated, different humans have hair with different characteristics, which is present in different locations (and in different volumes) on the head. Detectable micro-movements of the hair therefore vary considerably between different humans.

Different parts of the head 900 other than hair may also exhibit micro-movements under ultrasonic bombardment. In particular, facial skin 910 may also exhibit micro-movements (generally of a smaller scale than in hair) under ultrasonic bombardment. Skin in certain sensitive areas (i.e. at the corners of the users eyes) may exhibit relatively large micro-movements which can be detectable using the visual data.

Under ultrasonic bombardment, hair and facial skin may experience a generally oscillatory and elastic movement in accordance with the pulses and pauses in the transmitted signal. Generally, this movement is less than 0.25 mm at its maximum extent. Such a movement also generally has a frequency that is not visible to the human eye—for a 20 kHz source ultrasound pulse, a hair is expected to move at 5 kHz.

Figure 10:
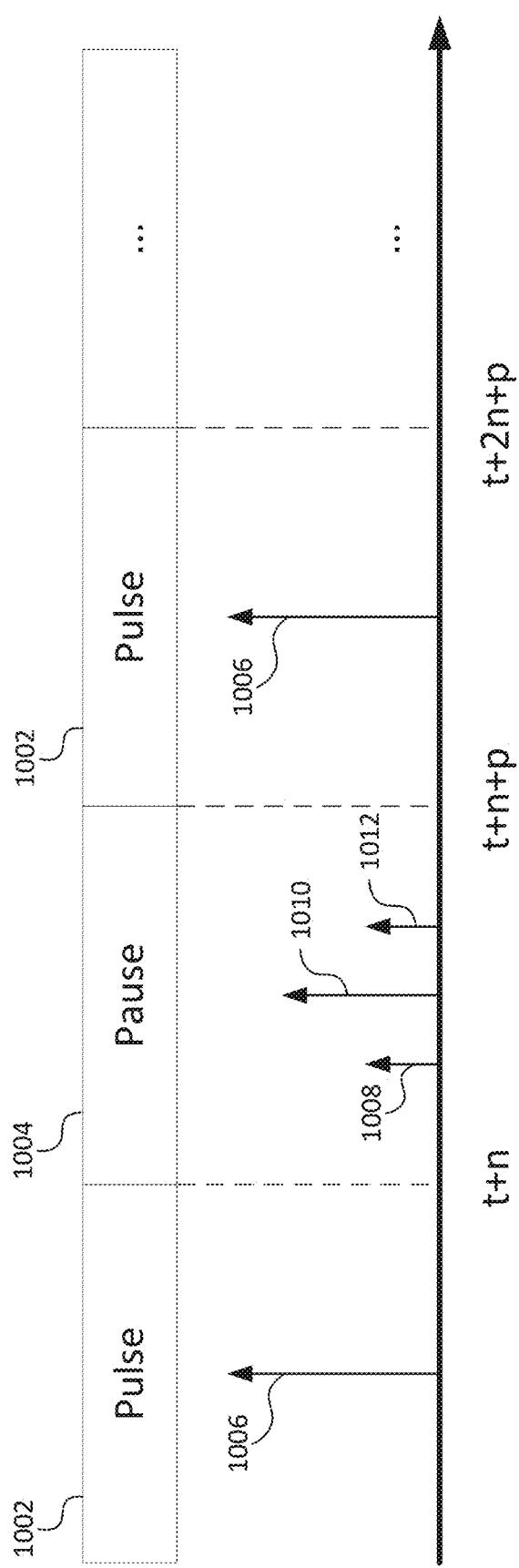
FIG. 10 is an image showing the pattern of the transmitted signal and the signals included in the audio data received by the microphone in the method of FIG. 8.

FIG. 10 is an image showing the pattern of the transmitted signal and the signals included in the audio data received by the microphone 104. In a third step 806 of the method 800, the transmitted signal is detected using the microphone 104 of the user device 100. As such, during a 'pulse' 1002, a peak 1006 corresponding to the transmitted pulse is received, while during a 'pause' 1004 only reflected secondary peaks 1008, 1010, 1012 are received (such secondary peaks may not be used in the method 800). The microphone 104 is turned on throughout the time period over which the ultrasound signal is transmitted (and optionally for a further time period once the transmission of the ultrasound signal has ceased). The use of the microphone 104 produces audio data which includes the transmitted ultrasound signal, along with any other audio signals detected in the vicinity of the microphone 104 which it is recording (such signals may include ambient sound and reflected ultrasound signals from nearby objects, including the presented head).

Optionally, once the transmission of the signal has stopped, the camera 106 and the microphone 104 may be switched off in order to save on battery power and data storage requirements of the user device 100.

In a fourth step 808, the visual data and the audio data are compared. Such comparison may be performed using a processor of the user device 100, or via an external server (in which case the visual data and the audio data, or a processed version thereof, are transmitted from the user device 100 to the external server). Processing locally on the phone may allow for improved speed and reliability of processing (as there is no need to rely on a data connection), while processing on an external server may provide improved processing power.

Both of the visual data and the audio data include information corresponding to the pattern of the transmitted ultrasound signal. In the visual data, the time periods during which micro-movements occur and the time periods during which micro-movements do not occur respectively correspond to the pulses and pauses in the ultrasound signal. In the audio track, pulses and pauses in the detected ultrasound signal of course correspond to the pulse and pauses in the transmitted ultrasound signal. As will be detailed later on, the information corresponding to the pattern in both the visual data and the audio track is extracted and compared. If the information from both the visual data and the audio track 'matches' (i.e. information corresponding to the same pattern is present in both the visual data and the audio data), this indicates that the presented head is the head of a real human, and thus that a live human is present. If no 'match' is found, this indicates that the presented head is a falsified representation of a human head, and thus that a live human is not present (in the sense that the 'human' presented to the device is not a live human—a live human may of course be presenting the falsified representation to the user device 100, for example by holding a picture in front of the user device 100).

It will be appreciated that the requirement of detecting a matching (i.e. coherent) pattern adds a further layer of security, as it protects against video attacks (which may include recorded micro-movements of a human head). An attacker will not be able to produce a matching micro-movement pattern unless they are able to predict the pattern of the transmitted ultrasound signal and replicate it faithfully (including correctly timing when the ultrasound signal is transmitted). Detecting a coherent pattern also allows several user devices 100 implementing the method 800 to be used independently in the same environment (without the risk of false positives caused by the detection of micro-movements caused by other ultrasound signals). This is particularly useful for environments such as border control or an entrance to a corporate building, where a plurality of user devices 100 (for example, tablet computers) implementing the method 800 may be provided as part of an access control system.

In a fifth step 810, an output is produced in dependence on the results of the comparison in the fourth step 808. The output may take the form of a message indicating that a real human (or a real human head) has been verified or has not been verified.

The method 800 may be implemented on a user device 100 having software architecture as shown in FIG. 5. The camera 106 uses a rolling shutter, and preferably has a relatively high frame rate of between 100 frames/second and 1000 frames/second. A high frame rate allows for clearer visible differences (as more motion-related information is available), which may provide improved accuracy.

The control module 152 is arranged to implement the visual data capturing step 802 of the method by turning the camera on in response to a signal from a processing component of the user device 100 (or alternatively an external signal), where the signal indicates that there is a need to determine whether a biometric feature of a live human is present. The control module 152 is also arranged to implement the signal transmission step 804 in part, in that it directs the stimulus module 154 to generate and transmit a signal. Similarly, the control module is also arranged to implement the signal transmission step 804 in part, in that it turns the microphone 104 on (optionally, at the same time as the camera is turned on).

The stimulus module 154 selects a pattern for the signal on the basis of data relating to a plurality of patterns in the data store. The plurality of patterns may differ in the duration and/or number of the pulses and/or the pauses in a single pattern. Furthermore, a variety of different types of signal may be used as the 'pulse' in the pattern; options include a sine sweep (for example, from around 18 KHz to 22 KHz), a pulsed ultrasound (for example, of around say 20 KHz), or a white noise. The stimulus module 154 may select the pattern in accordance with a cycle of various predetermined patterns, but preferably instead selects the pattern randomly (which may provide added security). In an alternative, the pattern is generated dynamically based on a plurality of variables (such as pause duration, pulse duration, and pulse signal type), which are determined dynamically or randomly. In all cases, the pattern of the signal (as well as the power characteristics of the signal) is selected so as to cause micro-movements of part of a live human head within a predetermined range of the user device 100.

The particular frequency of the ultrasound signal is selected in dependence on the hardware of the user device 100. A built-in loudspeaker of a smartphone can typically generate ultrasound of frequencies between 18 KHz and 22 KHz, and a built-in microphone of a smartphone can typically detect frequencies between 18 KHz and 22 KHz. As such, where the user device 100 is a smartphone, frequencies between 18 KHz and 22 KHz may be used.

Figure 11:
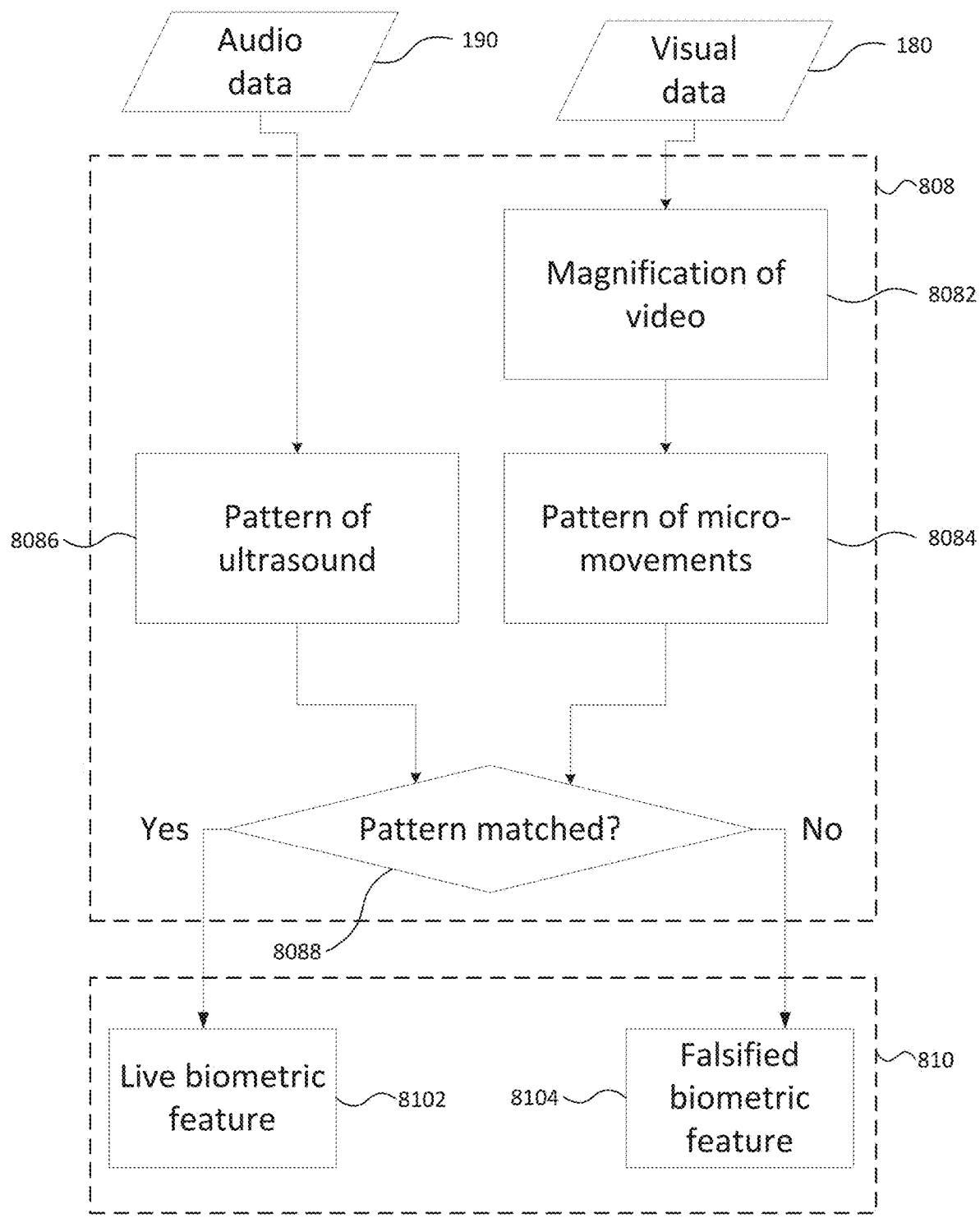
FIG. 11 is a flow diagram showing the various steps of the comparison step of the method of FIG. 8.

FIG. 11 is a flow diagram showing the various steps of the comparison step 808 of the method 800, which is implemented using the comparison module 156, and the output step 810 of the method 800.

As mentioned, visual data 180 is gathered via the camera 106. In an initial step 8082, the visual data 180 is processed by performing Eulerian video magnification, in which a predetermined frequency band of motion in the video is magnified, where the frequency band corresponds generally to the frequency of the micro-movements of the head (i.e. corresponding to the rolling shutter artefacts caused by the micro-movements). This allows micro-movements that would not normally be visible to the naked eye to be used in subsequent processing steps. An example method of video magnification is presented in Wadhwa, Neal, et al. "Phase-based video motion processing." ACM Transactions on Graphics (TOG) 32.4 (2013): 80. The video magnification in step 8082 acts to improve the quality of data that is input into the classifier, which may improve the accuracy of classification. Using video magnification also acts to filter out irrelevant movements (such as low frequency movements of the whole head, or other biometric feature).

The step 8082 further comprises applying a time correction for any delay between the pulses in the ultrasound signal and the micro-movements due to the inertia of the parts of the head which experience micro-movements.

In an optional subsequent step 8084, micro-movements within the processed visual data 180 are identified and extracted. More specifically, the processed visual data corresponding to a duration n (i.e. occurring during a 'pulse' phase 1002 of the signal, as shown in FIG. 10) is transformed into a binary signal which changes with respect to time, where '1' represents the presence of micro-movements and '0' represents the absence thereof. A '1' value is encoded if the processed visual data within the duration n shows a movement with an amplitude that is above a predetermined threshold.

At the same time, in optional step 8086, the audio data 190 received via the microphone 104 is processed to identify the pulses of the transmitted signal. Such processing may involve comparing the magnitude of the received signal against a predetermined threshold (for ultrasound frequencies). Comparison against a threshold may serve to filter out other audio sources, such as ambient sound and reflected ultrasound signals from the presented human head.

As with the visual data 190, the audio data is transformed into a binary signal which changes with respect to time, where '1' represents a signal pulse and '0' represents a signal pause.

In an optional subsequent step 8088, the extracted binary signals from the visual data and audio data are compared. Such comparison may be done by taking an XOR of the two binary patterns and then counting the number of zeroes (i.e. periods in which the pattern matches). A pre-determined percentage of zeroes in the data may be used as a threshold for determining whether the signals match—for example, the threshold may be 95%. If the binary signals match, a live biometric feature is present.

If a live biometric feature is identified, a positive output 8102 is issued in the output step 812. Conversely, if a live biometric feature is not identified, an output 8104 identifying the presented biometric feature as falsified is issued in the output step 812. Optionally, instead of or in addition to a binary output, a confidence score is produced.

Figure 12:
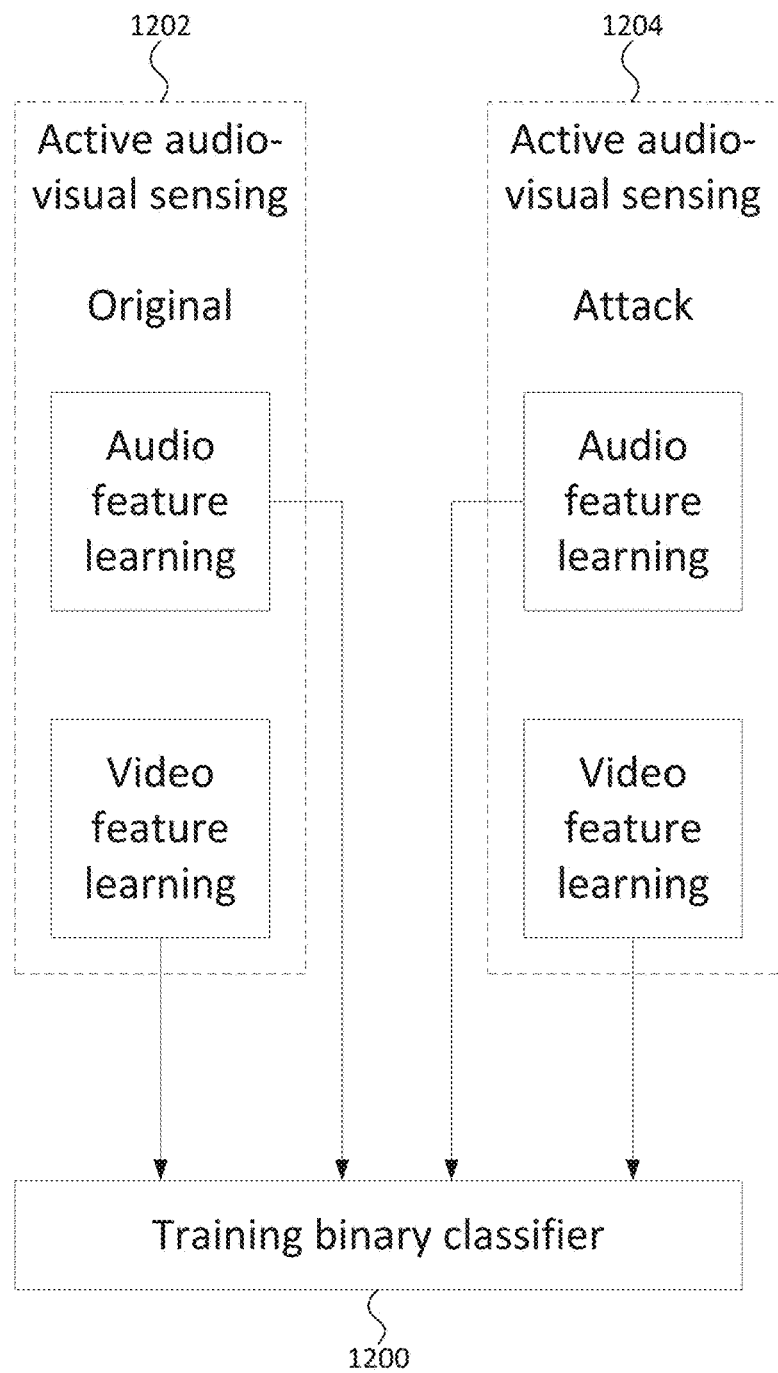
FIG. 12 is an image showing a method of training a binary classifier for use in the method of FIG. 8.

FIG. 12 is an image showing a method of training a binary classifier 1200 for use in the method 800. The step 810 in which the visual data and audio data are compared is preferably implemented using a trained binary classifier, which may provide more reliable identification as compared to simple comparison of a binary pattern. In use, the classifier receives the raw audio data and visual data as an input and produces a binary output based on its training. The classifier is trained based on raw audio data and visual data alone, using feature learning with a convolutional neural network. The classifier 1200 is trained on the basis of original data 1202 from presented live human faces as well as 'attack' data 1204 from falsified human faces.

As such, in this embodiment, the previously described optional steps 8084, 8086, 8088 of the comparison step 810 (in which binary signals are produced and compared) may be viewed as indicative of the processing performed by the binary classifier (which operates on the raw audio and visual data). Alternatively, the optional steps 8084, 8086, 8088 may be performed so as to test the accuracy of the output of the classifier (i.e. the test whether it is detecting the appropriate features). In a further alternative, the classifier may be arranged to perform explicitly the optional steps 8084, 8086, 8088.

As mentioned, the comparison may be performed using an external server, where the binary classifier 800 is provided on the external server. In such a case, the extracted binary signals may be transmitted to the external server over a data connection, and an output may be transmitted back to the user device once the comparison has been performed.

It will be appreciated that the classifier is not trained on the basis of explicitly identified features (or locations) within the visual data—instead, the classifier itself determines which features are important in classification. This may mean that the particular location of features exhibiting micro-movements (primarily, hair) does not affect the result of the classification, as the classifier is able to learn that the presence of micro-movements (particularly of hair) indicates that a live biometric feature is present, irrespective of the location of the micro-movements on the biometric feature.

Figure 13A:
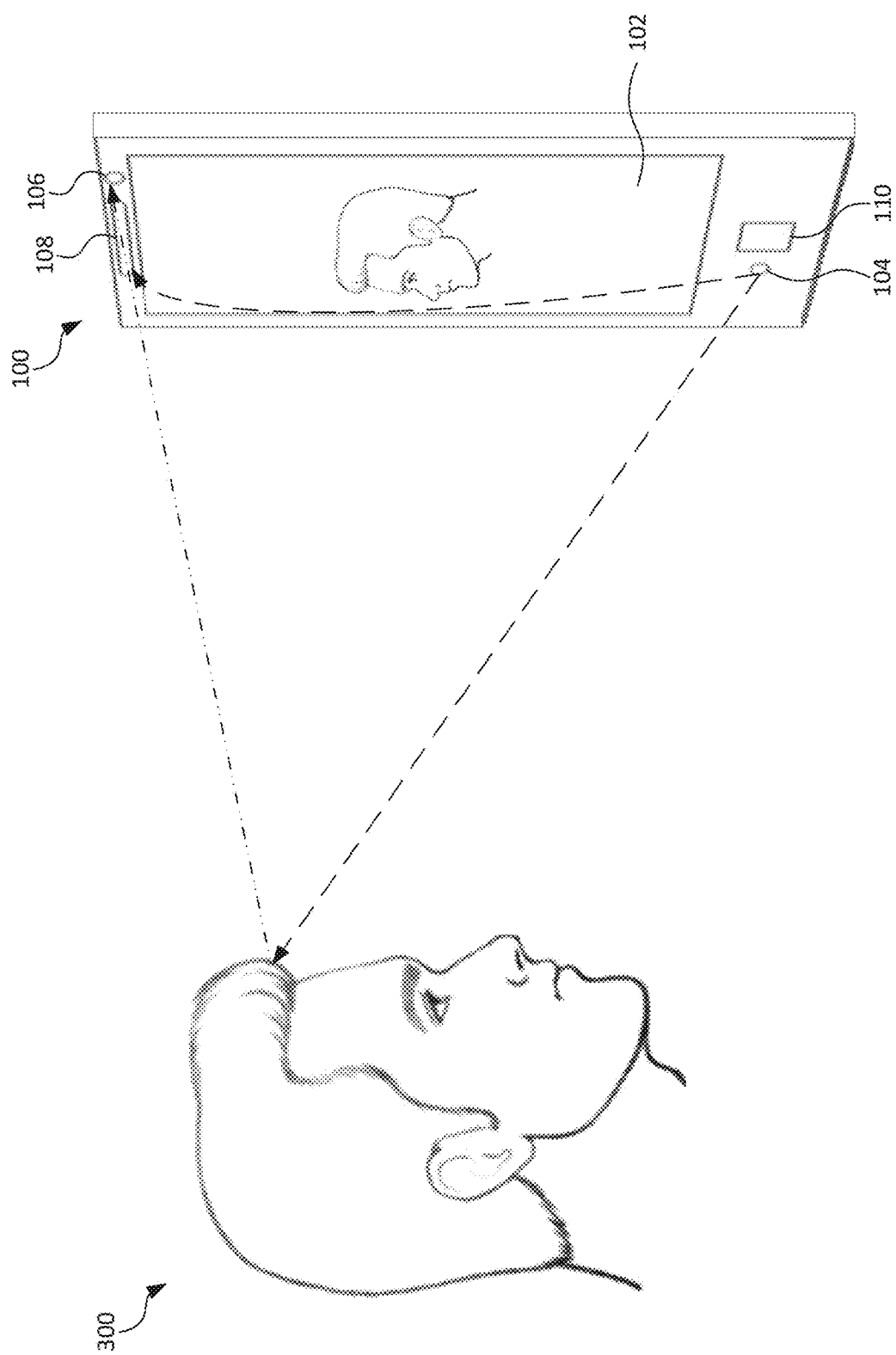
FIG. 13a is a schematic depiction of the user device performing the method of FIG. 8 on a live human face.

FIG. 13a is a schematic depiction of the user device 100 performing the method 800 on a live human face 300. As shown, the ultrasound signal transmitted by the microphone 104 causes micro-movements of part of the presented head (in this case, the hair), which is detected via the camera 106. At the same time, the transmitted ultrasound signal is received via the loudspeaker 108. The screen 102 of the user device 100 presents an image 112 of the presented head (where the image data is acquired via the camera)—this may assist a human attempting to verify themselves to the system to hold the user device at an appropriate orientation and distance relative to their presented face (so that all relevant parts of the head are in the camera frame and so that the head is in an acceptable range so that an ultrasound signal causes micro-movements).

Figure 13B:
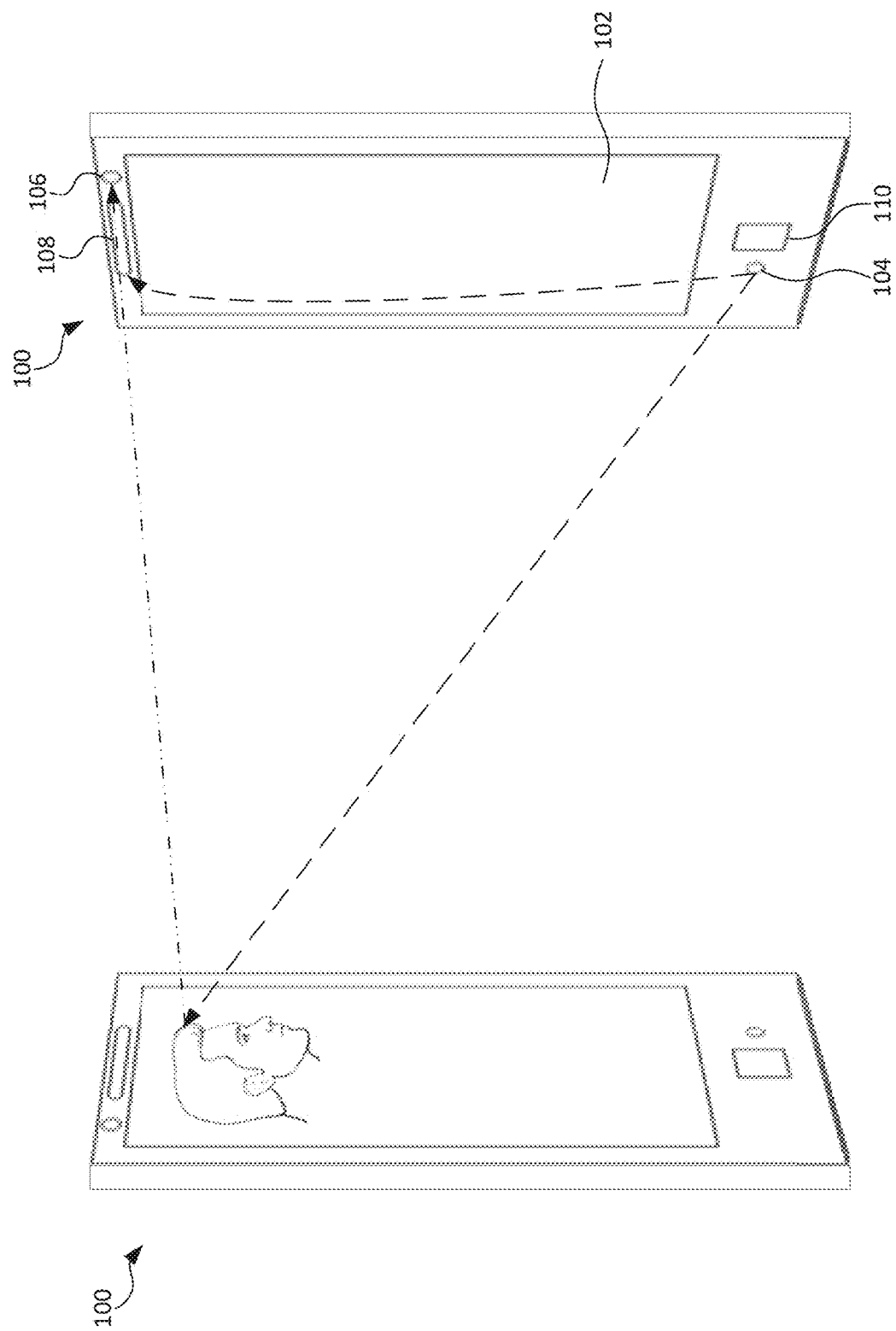
FIG. 13b is a schematic depiction of the user device performing the method of FIG. 8 on a falsified human face presented on another user device.

FIG. 13b is a schematic depiction of the user device 100 performing the method 200 on a falsified human face, which is presented on another user device 100. The signal is transmitted and received as before, but since no micro-movements corresponding to the transmitted pattern are caused, the falsified human face cannot be verified as a live human face.

Alternatives and Extensions for Second Method

In an alternative, the microphone 104 is not used to detect a transmitted audio signal. Instead, data related to the transmitted pattern (from the stimulus generation module 154) is provided directly to the comparison module 156. This data is then compared against the visual data 180 and/or the binary signal generated from the visual data, as described. Timing data related to when the signal was transmitted may also be provided from the stimulus generation module 154 to the comparison module 156 to aid in comparison. As will be appreciated, comparing detected micro-movements against an electronic record of the transmitted signal reduces the processing requirements of the method 800.

Optionally, the micro-movements detected via the visual data may be micro-expressions (i.e. brief, involuntary facial expressions indicative of an emotional state) in response to a presented stimulus.

As an alternative to capturing video via the camera, a plurality of photographs may instead be captured and used in subsequent analysis. The photographs are captured with a sufficiently high shutter speed so as to capture micro-movements of the present head. Such sufficient frame rates may be between 25 frames/second and 1000 frames/second.

Optionally, the reflected ultrasound signals from the presented human face (which are included in the audio track) are used in determining the pattern used in the transmitted signal.

Optionally, an alternative ultrasound transducer is used to transmit and/or receive ultrasound signals, rather than the loudspeaker 108 and/or microphone 104 of the user device 100. The transducer may, for example, be provided as part of separate apparatus.

Although the invention has principally been defined with reference to the transmitted signal being an ultrasound signal, it will be appreciated that a variety of alternative signals may be used, where the signal acts as a stimulus which causes an involuntary reaction from the presented human head (or other biometric representation) which is detectable via the visual data. For example, the transmitted signal may be a pulse of light (i.e. a 'flash') transmitted by a flash unit of the user device 100, external hardware, or by the screen 102. The sudden exposure of light caused by the flash causes a live human head to react involuntarily by partially closing the eyes. The flash may be transmitted according to a pattern, as previously described. Various other stimuli are contemplated, including audible sounds, visual stimuli presented using the screen 102, and vibrations of the user device 100.

Optionally, a time at which the stimulus is applied (i.e. when the ultrasound signal starts to be transmitted) is varied, so as to add an additional layer of security. For example, in one instance the signal may be transmitted instantly when the method 200 is used, while in another instance a delay may be applied before the signal is transmitted. Optionally, the delay used is randomly determined.

Alternatively, an array of loudspeaker and ultrasound may be used in addition to the typical loudspeaker and microphone available in a smartphone or tablet. Such an apparatus helps the algorithm not only to "perceive" the presence of live human face but may also "locate" the face.

Optionally, the method 800 may include further steps for mitigating the chances of success of a 'historic data attack' (i.e. an attack in which data relating to a 'successful' verification is obtained by an attacker by sniffing data during capture, where the historic data is resent on a different occasion in the hope that the verification will again be 'successful'). In an example, captured visual data and audio data is encrypted and timestamped. The method 800 may then include a further step of determining whether the time stamp indicates that the data is historic data (in which case a live human feature is not present). Alternatively or additionally, a server and/or the processor of the user device 100 may generate a pseudorandom key. A watermarking pattern may be generated based on the pseudorandom key, where the pattern is applied to the captured visual data and audio data. The method 800 may then include a further step of determining whether the watermarking pattern indicates that the data is historic data (i.e. whether the appropriate watermarking pattern is present).

Alternatives and Extensions for Both Methods

It will be appreciated that either of the described methods 200, 800 may act as a first stage of a broader facial or biometric verification method, where the first step (i.e. the described method 800 or 200) determines whether a live human is present. Subsequent steps can then determine whether the live human is a verified user.

Similarly, it will be appreciated that either of the described methods 200, 800 can form one part of a multimodal method for determining whether a live human is present, where other techniques are used as further inputs to develop a confidence 'score' that the presented feature is in fact a feature of a live human.

Optionally, a multi-class classifier may be used instead of a binary classifier in either of the described methods 200, 800.

Although the invention has principally been defined with reference to the relevant biometric feature being a human head or face, it will be appreciated that a variety of biometric features can be used, such as a hand, palm, or finger.

Either of the described methods 200, 800 may be implemented on any kind of portable user device 100 having a screen and a camera, such as a smartphone, a laptop computer, a desktop computer, or a tablet computer. Alternatively, either of the described methods 200, 800 may be implemented using a static device, such as those that might be included as part of or in association with entry systems, doors, automated passport control gates, or any other kind of system or device (static or otherwise) implementing a facial recognition system.

Any device or apparatus implementing either of the described methods 200, 800 may comprise a NFC (Near Field Communication) reader adapted to read a RFID (Radio Frequency IDentification) chip provided as part of an identity-certifying document (such as a passport, or national ID card or corporate employee badge) or another NFC capable device), which may allow data provided in the RFID chip via NFC to be compared to a face of the user that is verified using either of the described methods 200, 800 (as well as optionally allowing comparison between the data in the RFID chip via NFC and any photograph provided as part of the document).

Figure 14:
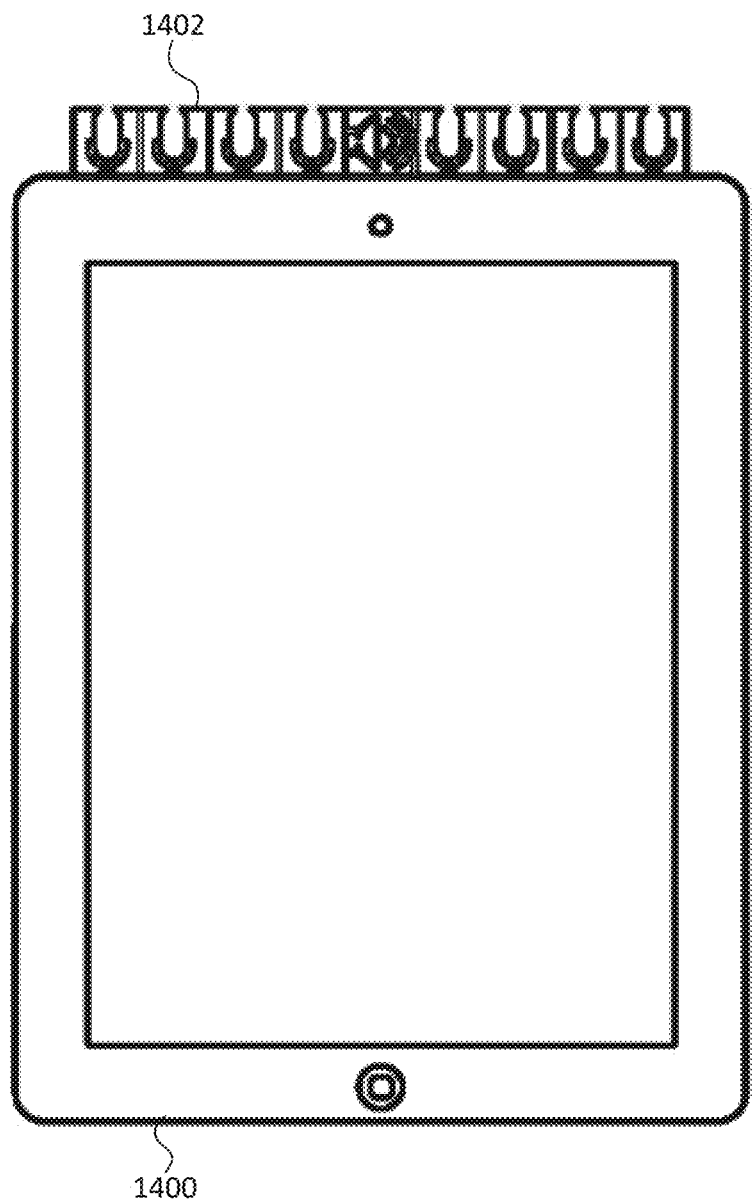
FIG. 14 is a schematic image of a tablet computer and loudspeaker and microphone array for implementing a described method

FIG. 14 is a schematic image of a tablet computer 1400 and loudspeaker and microphone array 1402 for implementing either of the described methods 200, 800. In one particular use case, a series of tablet computers 1400 implementing either of the described methods 200, 800 may be installed at an electronic border control (or as part of another access control system). A user may stand in front of the tablet computer 1400 and present their passport (allowing the NFC chip of the passport to be scanned, and the photograph information to be compared against a photograph taken via a camera of the tablet computer). In this scenario, to determine whether the user's face is a live biometric feature a commercially available loudspeaker and microphone array 1402 may be provided in communication with the tablet computer 100, where the ultrasound frequency range for such an array 1402 may be between 20 kHz and 30 MHz. The use of a loudspeaker and microphone array 1402 may allow for improved accuracy.

It will be appreciated that alternative components to a screen may be used for presenting the stimulus, such as a flat surface on to which the stimulus is projected.

It will be understood that the invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

Aspects of the invention are also set out in the following first set of numbered clauses, in which:

1. A method for determining whether a biometric feature of a live human is present, comprising:
using a camera, capturing visual data of a presented biometric feature;
transmitting a signal towards the biometric feature;
using a sensor, capturing data related to a reflected signal from the presented biometric feature; and
determining whether the visual data and the reflected signal data relate to a biometric feature having realistic dimensions thereby to determine that a live biometric feature is present.

2. A method according to clause 1, wherein determining whether the visual data and the reflected signal data relate to a biometric feature having realistic dimensions comprises determining whether the visual data and the reflected signal data in combination relate to a biometric feature having realistic dimensions.

3. A method according to any preceding clause, wherein the visual data relates to an angular size of the presented biometric feature.

4. A method according to any preceding clause, wherein the reflected signal data relates to a distance of the presented biometric feature from the sensor.

5. A method according to any preceding clause, wherein the reflected signal data relates to the shape of a presented biometric feature.

6. A method according to any preceding clause, wherein determining whether the visual data and the reflected signal data relate to a biometric feature having realistic dimensions comprises comparing the visual data and the reflected signal data against a model related to realistic dimensions of a biometric feature.

7. A method according to clause 6, wherein the model relates to a ratio of angular size and distance from the sensor for a live biometric feature.

8. A method according to clause 6 or 7, further comprising collecting data for use in the model, the data for use in the model comprising visual data and reflected signal data of a biometric feature of a live human and visual data and reflected signal data of a falsified biometric feature of a live human.

9. A method according to any of clause 6 to 7, wherein the model is a trained classifier.

10. A method according to clause 9, further comprising training the model based on presented biometric features of live humans and presented falsified biometric features of live humans.

11. A method according to any of clause 6 to 10, wherein the model comprises a convolutional neural network.

12. A method according to any preceding clause, further comprising transmitting data related to the presented biometric feature for remote processing.

13. A method according to any preceding clause, wherein transmitting a signal comprises transmitting a signal in accordance with a predetermined pattern.

14. A method according to clause 13, wherein the pattern is formed from at least one pulse and at least one pause.

15. A method according to clause 14, wherein the pattern is configured such that at least one pulse in the reflected signal is received during the at least one pause in the transmitted signal.

16. A method according to any of clauses 13 to 15, further comprising selecting a pattern from a plurality of patterns.

17. A method according to any of clauses 13 to 16, wherein selecting a pattern comprises randomly selecting a pattern.

18. A method according to any preceding clause, wherein transmitting a signal comprises using a single transmitter.

19. A method according to any preceding clause, wherein a single sensor is used to capture data related to a reflected signal.

20. A method according to any preceding clause, wherein the biometric feature is one or more of: a face; a hand; a palm; a thumb; and one or more fingers.

21. A method according to any preceding clause, further comprising, using a screen, presenting the captured visual data to the presented biometric feature.

22. A method according to any preceding clause, further comprising, using a screen, instructing a live human to locate the biometric feature at a particular position relative to the camera and/or the sensor.

23. A method according to any preceding clause, further comprising, using a screen, instructing a live human to perform a particular gesture with the biometric feature.

24. A method according to any preceding clause, wherein the sensor is a microphone.

25. A method according to clause 24, wherein the signal comprises a sound wave.

26. A method according to clause 25, wherein the signal comprises an ultrasound wave.

27. A method according to clause 26, wherein the frequency of the ultrasound wave is randomly selected within a predetermined range.

28. A method according to any preceding clause, wherein the method forms part of a multi-modal method for determining whether a biometric feature of a live human is present.

29. A method of verifying the identity of a user, comprising performing the method of any of clauses 1 to 28; and
verifying the identity of the user by comparing biometric information of the user against a database of biometric information of verified users.

30. A computer program product comprising software code adapted to carry out the method of any of clauses 1 to 29.

31. A client or user device in the form of a telecommunications device or handset such as a smartphone or tablet adapted to execute the computer program product of clause 30.

32. Apparatus for determining whether a biometric feature of a live human is present, comprising:
a camera for capturing visual data of a presented biometric feature;
a module adapted to transmit a signal towards the biometric feature;
a sensor for capturing data related to a reflected signal from the presented biometric feature; and
a module whether the visual data and the reflected signal data relate to a biometric feature having realistic dimensions thereby to determine that a live biometric feature is present.

33. Apparatus according to clause 32, wherein the module adapted to transmit a signal is a loudspeaker; and the signal is an ultrasound signal.

34. Apparatus according to clause 32 or 33, wherein the sensor for capturing data related to a reflected signal is a microphone.

35. Apparatus according to any of clauses 32 to 34, wherein the apparatus is in the form of one or more of: a smartphone; a laptop computer; a desktop computer; or a tablet computer; an automated passport control gate; and an entry system.

36. A system for determining whether a biometric feature of a live human is present, comprising:
a user device, comprising:
a camera for capturing visual data of a presented biometric feature;
a module adapted to transmit a signal towards the biometric feature; and
a sensor for capturing data related to a reflected signal from the presented biometric feature; and
a remote determination module adapted to determine whether the visual data and the reflected signal data relate to a biometric feature having realistic dimensions thereby to determine that a live biometric feature is present.

37. A method for determining whether a biometric feature of a live human is present, comprising:
using a sensor, capturing data related to a presented biometric feature;
applying a stimulus to the presented biometric feature, wherein the stimulus is capable of causing an involuntary response from a biometric feature of a live human; and
determining whether the data indicates that the involuntary response has occurred thereby to determine whether a biometric feature of a live human is present.

38. A method according to clause 37, wherein applying a stimulus comprises transmitting a signal, wherein the signal is adapted to cause an involuntary response from a biometric feature of a live human.

39. A method according to clause 38, wherein transmitting a signal comprises transmitting a signal in accordance with a predetermined pattern.

40. A method according to clause 39, wherein determining whether the data indicates that the involuntary response has occurred comprises determining whether a pattern corresponding to the predetermined pattern is present in the captured data.

41. A method according to clause 39 or 40, wherein the pattern is formed from at least one pulse and at least one pause.

42. A method according to any of clauses 39 to 41, further comprising selecting a pattern from a plurality of patterns.

43. A method according to any of clauses 39 to 42, wherein selecting a pattern comprises randomly selecting a pattern.

44. A method according to any of clauses 40 to 43, further comprising detecting the transmitted signal using a further sensor.

45. A method according to clause 44, wherein determining whether the data indicates that the involuntary response has occurred comprises comparing data from the sensor and the further sensor.

46. A method according to clause 45, wherein determining whether the data indicates that the involuntary response has occurred comprises applying a time correction to data from the sensor and data from the further sensor.

47. A method according to clause 44 or 45, wherein the further sensor is a microphone.

48. A method according to any of clauses 40 to 47, wherein the signal comprises a sound wave.

49. A method according to clause 48, wherein the signal comprises an ultrasound wave.

50. A method according to any of clauses 37 to 49, wherein the involuntary response is a movement of at least part of the biometric feature.

51. A method according to clause 50, wherein the sensor is a camera; and the captured data is visual data.

52. A method according to clause 51, wherein determining whether the data indicates that the involuntary response has occurred comprises determining whether the visual data includes rolling shutter artefacts indicative of the movement of at least part of the biometric feature.

53. A method according to any of clauses 50 to 52, wherein the movement is generally elastic.

54. A method according to any of clauses 50 to 53, wherein the maximum extent of the movement is less than 2 mm.

55. A method according to clause 54, wherein the maximum extent of the movement is less than 1 mm.

56. A method according to clause 55, wherein the maximum extent of the movement is less than 0.5 mm.

57. A method according to clause 56, wherein the maximum extent of the movement is less than 0.2 mm.

58. A method according to any of clauses 50 to 57, wherein the biometric feature is a head.

59. A method according to clause 58, wherein the movement is a movement of one or more of: hair; and facial skin.

60. A method according to any of clauses 50 to 59, further comprising identifying features on the presented biometric feature where movement is expected to occur.

61. A method according to any of clauses 50 to 59, further comprising magnifying a pre-determined frequency band corresponding to a frequency of the movement of at least part of the biometric feature.

62. A method according to any of clauses 37 to 61, wherein determining whether the data indicates that the involuntary response has occurred comprises comparing data captured using the sensor while the stimulus is applied to data captured using the sensor while the stimulus is not applied.

63. A method according to any of clauses 37 to 62, wherein determining whether the data indicates that the involuntary response has occurred comprises comparing data captured using the sensor against a model, wherein the model represents an involuntary response of a live human to the stimulus.

64. A method according to clause 63, further comprising collecting data related to an involuntary response of a biometric feature of a live human to the stimulus and a response of a falsified biometric feature of a live human for use in the model.

65. A method according to clause 63 or 64, wherein the model is a trained classifier.

66. A method according to clause 65, further comprising training the model based on presented biometric features of live humans and presented falsified biometric features of live humans.

67. A method according to any of clauses 63 to 66, wherein the model comprises a convolutional neural network.

68. A method according to any of clauses 63 to 67, further comprising transmitting data related to the presented biometric feature for remote processing.

69. A method according to any of clauses 37 to 68, further comprising, using a screen, presenting the captured visual data to the presented biometric feature.

70. A method according to any of clauses 37 to 69, wherein the method forms part of a multi-modal method for determining whether a biometric feature of a live human is present.

71. A method of verifying the identity of a user, comprising
performing the method of any of clauses 37 to 70; and
verifying the identity of the user by comparing biometric information of the user against a database of biometric information of verified users.

72. A computer program product comprising software code adapted to carry out the method of any of clauses 37 to 70.

73. A client or user device in the form of a telecommunications device or handset such as a smartphone or tablet adapted to execute the computer program product of clause 72.

74. Apparatus for determining whether a biometric feature of a live human is present, comprising:
a sensor for capturing data related to a presented biometric feature;
a module adapted to apply a stimulus to the presented biometric feature, wherein the stimulus is capable of causing an involuntary response from a biometric feature of a live human; and
a module adapted to determine whether the data indicates that the involuntary response has occurred thereby to determine whether a biometric feature of a live human is present.

75. Apparatus according to clause 74, wherein the sensor is a camera; and the captured data is visual data.

76. Apparatus according to clause 74 or 75, wherein the module adapted to apply a stimulus is a loudspeaker; and the stimulus is an ultrasound signal.

77. Apparatus according to any of clauses 74 to 76, further comprising a microphone for detecting the transmitted signal.

78. Apparatus according to any of clauses 74 to 77, wherein the apparatus is in the form of one or more of: smartphone; a laptop computer; a desktop computer; or a tablet computer; an automated passport control gate; and an entry system.

79. A system for determining whether a biometric feature of a live human is present, comprising:
a user device, comprising:
a sensor for capturing data related to a presented biometric feature; and
a module adapted to apply a stimulus to the presented biometric feature, wherein the stimulus is capable of causing an involuntary response from a biometric feature of a live human; and
a remote determination module adapted to determine whether the data indicates that the involuntary response has occurred thereby to determine whether a biometric feature of a live human is present.

80. A method of perturbing an object using a user device, comprising, using a loudspeaker of the user device, transmitting an ultrasound signal towards the object.

81. A method according to clause 80, further comprising, using a camera, detecting a perturbation of the object in response to the ultrasound signal.

What is claimed is:

1. A method for determining whether a biometric feature of a live human is present, comprising:
    using a camera, capturing visual data of a presented biometric feature;
    transmitting a sound wave towards the biometric feature in accordance with a pattern; wherein the pattern comprises at least one pulse each being followed by a pause with a random duration;
    using a sensor, capturing data related to a reflected signal from the presented biometric feature;
    wherein the pattern is configured such that a pulse in the reflected signal,- said pulse corresponding to a reflection of the most recently transmitted pulse from the presented biometric feature, is received during the pause following the most recently transmitted pulse; and
    determining whether the visual data and the reflected signal data relate to a biometric feature having realistic dimensions thereby to determine that a live biometric feature is present.

2. A method according to claim 1, wherein determining whether the visual data and the reflected signal data relate to a biometric feature having realistic dimensions comprises determining whether the visual data and the reflected signal data in combination relate to a biometric feature having realistic dimensions.

3. A method according to claim 1, wherein the visual data relates to an angular size of the presented biometric feature.

4. A method according to claim 1, wherein the reflected signal data relates to a distance of the presented biometric feature from the sensor.

5. A method according to claim 1, wherein the reflected signal data relates to the shape of a presented biometric feature.

6. A method according to claim 1, wherein determining whether the visual data and the reflected signal data relate to a biometric feature having realistic dimensions comprises comparing the visual data and the reflected signal data against a model related to realistic dimensions of a biometric feature.

7. A method according to claim 5, further comprising collecting data for use in the model, the data for use in the model comprising visual data and reflected signal data of a biometric feature of a live human and visual data and reflected signal data of a falsified biometric feature of a live human.

8. A method according to claim 5, wherein the model is a trained classifier.

9. A method according to claim 8, further comprising training the model based on presented biometric features of live humans and presented falsified biometric features of live humans.

10. A method according to claim 5, wherein the model comprises a convolutional neural network.

11. A method according to claim 1, further comprising transmitting data related to the presented biometric feature for remote processing.

12. A method according to claim 1, further comprising selecting a pattern from a plurality of patterns; wherein selecting a pattern comprises randomly selecting a pattern.

13. A method according to claim 1, wherein transmitting a signal comprises using a single transmitter.

14. A method according to claim 1, wherein a single sensor is used to capture data related to a reflected signal.

15. A method according to claim 1, wherein the biometric feature is one or more of: a face; a hand; a palm; a thumb; and one or more fingers.

16. A method according to claim 1, further comprising, using a screen, performing one or more of the following actions: presenting the captured visual data to the presented biometric feature; instructing a live human to locate the biometric feature at a particular position relative to the camera and/or the sensor; and instructing a live human to perform a particular gesture with the biometric feature.

17. A method according to claim 1, wherein the sensor is a microphone.

18. A method according to claim 17, wherein the signal comprises an ultrasound wave.

19. A method according to claim 1, wherein the method forms part of a multi-modal method for determining whether a biometric feature of a live human is present.

20. A method of verifying the identity of a user, comprising performing the method of claim 1; and
verifying the identity of the user by comparing biometric information of the user against a database of biometric information of verified users.

21. A method for determining whether a biometric feature of a live human is present, comprising:
using a sensor, capturing visual data related to a presented biometric feature;
transmitting an ultrasound wave to the presented biometric feature, wherein the ultrasound wave is capable of causing an involuntary response from a biometric feature of a live human; and
determining whether the data indicates that the involuntary response has occurred thereby to determine whether a biometric feature of a live human is present.

22. A computer program product having a non-transitory computer-readable medium comprising software code adapted to carry out the method of Claim 1.

23. A client or user device in the form of a telecommunications device or handset such as a smartphone or tablet adapted to execute the computer program product of Claim 22.

24. Apparatus for determining whether a biometric feature of a live human is present, comprising:
a camera for capturing visual data of a presented biometric feature;
a transmitter adapted to transmit a sound wave towards the biometric feature in accordance with a—pattern; wherein the pattern comprises at least one pulse each being followed by a pause with a random duration;
a sensor for capturing data related to a reflected signal from the presented biometric feature;
wherein the pattern is configured such that a pulse in the reflected signal, said pulse corresponding to a reflection of the most recently transmitted pulse from the presented biometric feature, is received during the pause following the most recently transmitted pulse; and
a processor adapted to determine whether the visual data and the reflected signal data relate to a biometric feature having realistic dimensions thereby to determine that a live biometric feature is present.

\* \* \* \* \*

UNITED STATES PATENT AND TRADEMARK OFFICE
CERTIFICATE OF CORRECTION

PATENT NO. : 11,308,340 B2
APPLICATION NO. : 16/108183
DATED : April 19, 2022
INVENTOR(S) : Hasan Sheikh Faridul et al.

It is certified that error appears in the above-identified patent and that said Letters Patent is hereby corrected as shown below:

On the Title Page

Item (30) Foreign Application Priority Data:
Line 1, "1713469" should be changed to -- 1713469.3 --
Line 2, "1713471" should be changed to -- 1713471.9 --

Signed and Sealed this
Twentieth Day of December, 2022

Katherine Kelly Vidal
*Director of the United States Patent and Trademark Office*